United States Patent
Bandyk

(10) Patent No.: US 12,516,564 B2
(45) Date of Patent: Jan. 6, 2026

(54) SECURITY SYSTEM FOR A MOVEABLE BARRIER OPERATOR

(71) Applicant: THE CHAMBERLAIN GROUP LLC, Oak Brook, IL (US)

(72) Inventor: Edward Bandyk, Woodridge, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 160 days.

(21) Appl. No.: 18/516,680

(22) Filed: Nov. 21, 2023

(65) Prior Publication Data

US 2024/0141714 A1 May 2, 2024

Related U.S. Application Data

(63) Continuation of application No. PCT/US2022/031217, filed on May 26, 2022.

(60) Provisional application No. 63/194,403, filed on May 28, 2021.

(51) Int. Cl.
E05F 15/77 (2015.01)
E05F 15/668 (2015.01)

(52) U.S. Cl.
CPC ............ *E05F 15/77* (2015.01); *E05F 15/668* (2015.01); *E05Y 2900/106* (2013.01)

(58) Field of Classification Search
CPC .. E05F 15/77; E05F 15/668; E05Y 2900/106; G06F 21/445; G06F 7/535; H04W 12/50; G07C 9/00309; H04L 67/10
See application file for complete search history.

(56) References Cited

U.S. PATENT DOCUMENTS

| | | |
|---|---|---|
| 5,798,711 A | 8/1998 | Issa et al. |
| 5,914,667 A | 6/1999 | Issa et al. |
| 5,949,349 A | 9/1999 | Farris et al. |
| 10,005,429 B2 | 6/2018 | Peeters et al. |
| 10,643,411 B1 * | 5/2020 | Perkins, Jr. ........ G07C 9/00182 |
| 10,826,876 B1 | 11/2020 | Sinn et al. |
| 2007/0005806 A1 | 1/2007 | Fitzgibbon et al. |
| 2018/0080280 A1 * | 3/2018 | Bodurka .............. G05B 19/042 |
| 2019/0200225 A1 | 6/2019 | Fitzgibbon |

OTHER PUBLICATIONS

European Patent Office; Communication pursuant to Rules 161(2) and 162 EPC; dated Jan. 9, 2024; in connection with EP Application No. 22812202.4; 3 pages.
EPO, Extended European Search Report, dated Mar. 3, 2025, in EP Application No. 22812202.4, 9 pages.
International Search Report and Written Opinion of the ISA/AU, mailed Dec. 15, 2022, in PCT Application No. PCT/US2022/031217; 11 pages.

* cited by examiner

*Primary Examiner* — Vernal U Brown
(74) *Attorney, Agent, or Firm* — Foley IP Law, PLLC

(57) ABSTRACT

Electronic systems are provided for secure actuation of a remote device such as a moveable barrier operator. The systems address the "man in the middle" problem of persons intercepting and duplicating radio frequency signals from a control device by offsetting one or more portions of a message in order to obscure content of the message.

18 Claims, 27 Drawing Sheets

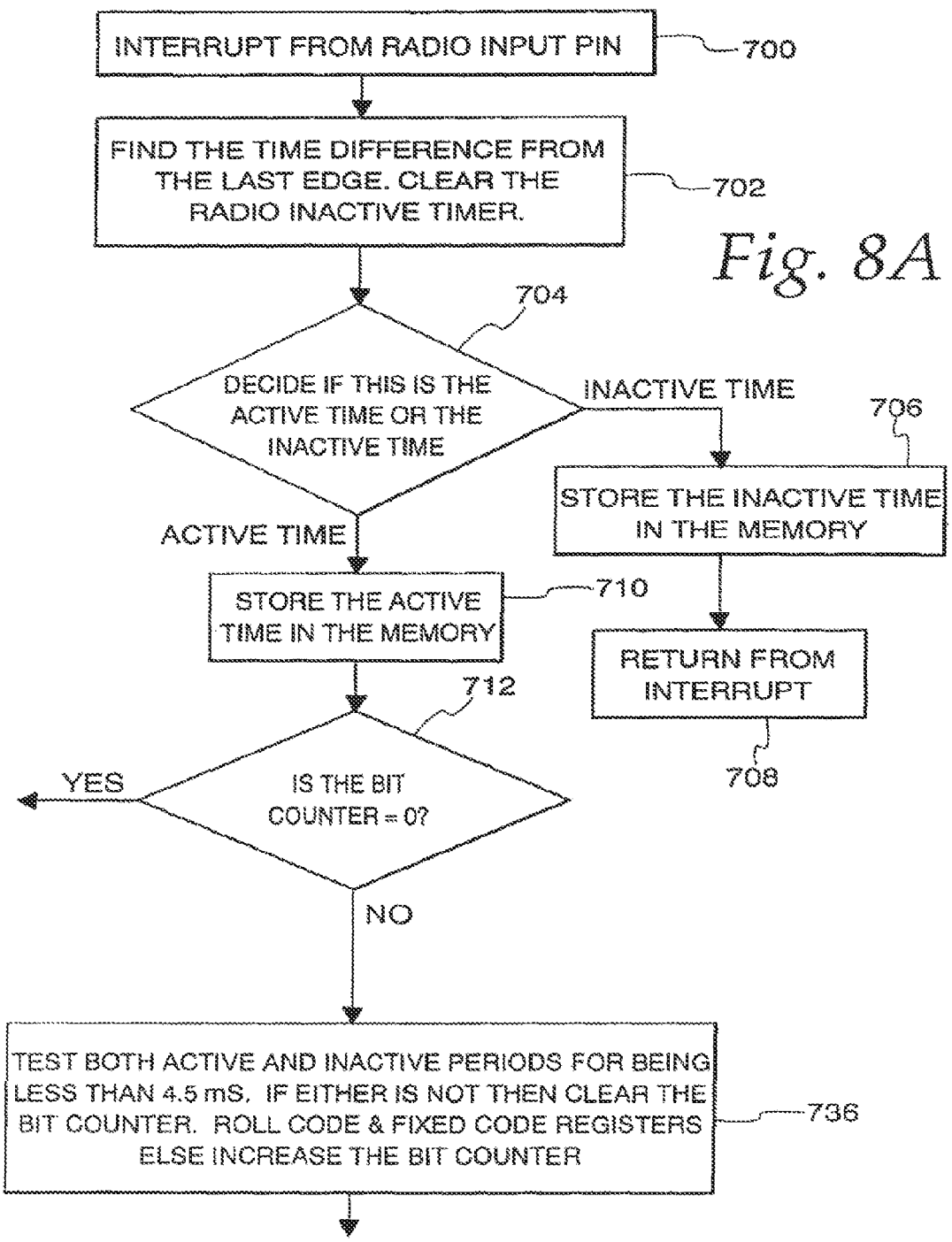

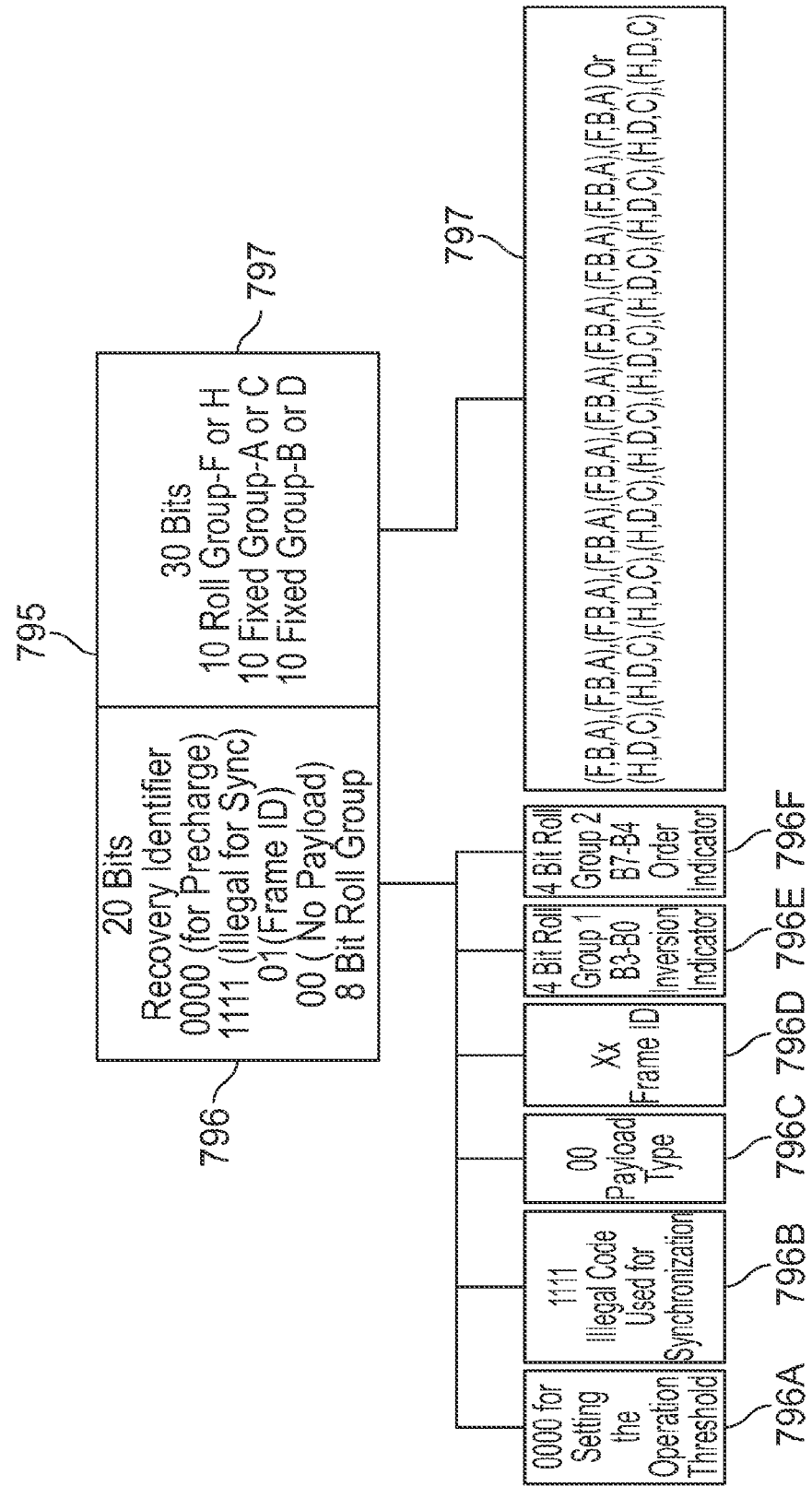

SECURITY SYSTEM FOR A MOVEABLE BARRIER OPERATOR

CROSS-REFERENCE TO RELATED APPLICATION

This application is a continuation of PCT Application No. PCT/US2022/031217, filed May 26, 2022, which claims the benefit of U.S. Provisional Application No. 63/194,403, filed May 28, 2021. The disclosures of which are hereby incorporated by reference in their entirety.

FIELD

This disclosure relates in general to security systems that allow operation upon the receipt of a properly coded signal. More particularly, a security system or a barrier operator system is disclosed, such as a garage door operator, employing a transmitter and a receiver that communicate via codes having at least a portion thereof that changes with operations of the transmitter.

BACKGROUND

Systems including garage door operators or other barrier operators are known to include an electric motor connectable through a transmission to a door, gate or other moveable barrier that is to be opened and closed. Because many of these systems are associated with residences, as well as with garages, it is important that opening of the barrier be permitted only by one who is authorized to obtain entry to the area protected by the barrier. Some garage door operator systems have in the past employed mechanical lock and key arrangements associated with electrical switches mounted on the outside of the garage. While these systems enjoy a relatively high level of security against tampering, they are inconvenient to use and may present safety concerns by requiring the user to exit their vehicle to open the garage door.

It is also known to provide radio-controlled garage door operators, which include a garage door operator unit having a radio receiver and a motor connected to the garage door. The radio receiver is adapted to receive radio frequency signals or other electromagnetic signals having particular signal characteristics that, when received, cause the door to be opened. Such systems can include radio transmitters employing coded transmissions of multiple or three-valued digits, also known as "trinary bits" or other serial coded transmission techniques. Some systems comprise code hopping encoders that generate serial codes having fixed portions (i.e., which do not change with repeated actuation of the encoding portion) and changing code or rolling code portions which alter with each actuation of the encoding portion of the system's transmitter. In order to avoid inadvertent activation of a transmitter when out of range of the receiver causing the transmitter rolling code to be permanently out of sync with, and therefore not recognized by, a receiver, these code hopping encoders provide a window forward system, that is they are operable with systems having code receivers which recognize as a valid code not a single rolling code, but a plurality of rolling codes within a certain code window or window of values which are the values which would be generated on a finite (e.g. relatively small number) of actuations or activations as compared to the total number of rolling codes available.

While security systems have become more sophisticated, persons wishing to gain unauthorized access to commit property or person-related crimes have become more sophisticated as well. It is known in the security industry today that devices are being made available that can intercept or steal rolling code.

Methods also exist for pairing remote control devices with a barrier operator so that a user may purchase additional control devices for use with a single barrier operator or utilize a control device integrated into a vehicle. When a moveable barrier operator is installed, the homeowner typically receives at least one handheld transmitter that is already preconfigured to actuate the operator (also referred to as a transmitter learned by an operator, or a transmitter programmed to/paired with/trained to an operator). To operate the door from a new learning transceiver, there is generally a two-step learning procedure for training the new learning transceiver. The first step is to teach the learning transceiver the type and potentially the code of the owner's handheld transmitter. While holding the handheld transmitter a few inches from the learning transceiver, the owner presses and holds the handheld transmitter's button at the same time as pressing a button on the learning transceiver to teach the access code type and frequency to the learning transceiver. The second step of the learning process is to train the learning transceiver to the operator. To do this, the barrier operator is transitioned from an operating mode into a learn or program mode e.g. when a learn button of the barrier operator is pressed, and within a given time period the learning transceiver should be activated. In another prior approach, these two steps are combined into a single step or done simultaneously. In one example, a pre-trained transmitter transmits a code to both an operator and a learning transceiver, which both save the code. Next, within a predetermined amount of time, the button is pressed on the learning transceiver to transmit a second rolling access code, which is received by the operator and compared with the first rolling type access code saved in the operator. If a predetermined correlation exists between the first rolling type access code and the second rolling type access code, the operator stores the representation of the second rolling type access code from the learning transceiver. Requiring that a user physically possess a pre-trained transmitter to train a learning transceiver to a moveable barrier operator according to this approach ensures that the user is authorized to access the garage.

SUMMARY

The disclosure relates in general to an electronic system for providing security for actuation of a particular device. The system may be useful, for instance, in a barrier operator system such as a garage door operator by allowing the garage door to be opened and closed in a relatively secure fashion while preventing persons who may be intercepting the radio frequency signals from being able to access the garage without authorization. Encoding systems are provided that include heightened security by using a changing or rolling code in combination with additional measures that prevent or minimize interception and copying of the code during use or pairing of devices.

In some forms, systems and methods are provided in which particular sequences of code communicated between at least two devices are obscured by shifting their positions within exchanged messages according to specific placement parameters. Obscuration by shifting a position of data in a message addresses the known "man in the middle" problem of persons intercepting and duplicating signals from an authorized device, such as by use of a "code grabber." For instance, a challenge response may insert data into a specific position of a protocol data unit for additional security, the exact position depending on parameters in a previous message. The placement parameters may be, for instance, a positional shifting of the start of a fixed or changing code relative to a specific point in the message (e.g. the start of the message, the end of a message header, the end of a preamble portion, or another point or segment in the message having an identifiable configuration). If the first device communicates with the second device and the first device is configured to expect specific message content to begin at a specific point in a responsive message from the second device, the first device will be able to properly read and, if necessary, decrypt that specific message content as long as the second device is able to appropriately place that specific message content within its responsive message. However, if the second device cannot accurately determine the proper placement for the specific message content, the first device will not read the specific message content properly and consequently will be unable to appropriately validate the response that is received from the second device. If the first device is unable to validate the message from the second device, the first device will also not be able to respond with an appropriate subsequent message recognizable by the second device or otherwise effectively communicate with the second device. Multiple levels of encryption may be used in communications between devices, and positioning of a particular sequence may be determined for either the sequence's encrypted or unencrypted state. For instance, a first device configured to send a first message may determine a position in which to expect a particular sequence of interest in a subsequent second encrypted message, and send the first message to a second device with information that permits the second device to calculate the position for the sequence of interest. The second device may then then encrypt the sequence of interest, place the encrypted sequence at the indicated position within the second message, and transmit the second message to the first device. When the first device receives the second message, the first device is then able to locate the encrypted sequence within the encrypted second message, decrypt the sequence, and determine information about the second device from the sequence. The second device may send the second message in packets with various layers of encryption, such that the first device may reconstruct and decrypt the second message before locating and decrypting portions of the message. Alternatively, the first device may indicate via a first message a position within a decrypted message in which to expect an unencrypted sequence of interest, causing the second device to place the sequence of interest at the indicated position within a second message prior to encrypting the second message with one or more levels of encryption. Then, when the second device encrypts and sends the second message, the first device fully decrypts the second message before locating the position and determining the sequence of interest.

In some forms, a first device (such as a hand-held or vehicle-mounted controller or transmitter) communicates with a second device (such as a mobile barrier operator) to effect an action by the second device, and the first device also instructs the second device via placement parameters to include in one or more subsequent response transmissions an offset code sequence separated from the beginning of said responsive transmission(s) (or separated from another point in the transmission(s)) by a determined amount or distance (such as a set number of bits or bytes). For instance, the first device may in some forms transmit a first message that includes identifying content relating to the first device (such as a first fixed code and/or a first changing code), the first message further identifying an offset position at which the second device is to include within a response message an offset code sequence containing identifying information relating to the second device (for instance a second fixed code and/or second changing code). When the first device receives the response message from the second device comprising the offset code sequence positioned within the response message according to information from the first message, the first device attempts to locate the offset position and read the offset code sequence. If the first device properly locates the offset code sequence, the first device is then capable of validating the response message, such as by comparing content from the offset code sequence (such as a fixed code and/or changing code) to stored code values. Upon validating the response, the first device may transmit a third message, such as a message including at least a first fixed code and a changed version of a changing code received from the second device. However, if either the first or second device incorrectly determines the offset position of the offset code sequence, the first device will read a different sequence instead of the offset code sequence and therefore fail to validate the response. For instance, if the first device does not begin at the appropriate offset position of the response message, the first device will read a sequence that, when compared to the intended offset code sequence, contains additional bits at the beginning, is missing bits at the beginning, or, if the starting position differs enough from the offset position, is an entirely different sequence.

In some forms, methods of secure communication between a first device and a second device may involve transmitting from the first device to the second device a first message, the first message including at least a first fixed code and a first changing code, the first message further indicating an offset position at which to include an offset code sequence within a response message from the second device. The first device may indicate the offset position at which to include the offset code sequence through information contained in the first message, such as a fixed code portion of the first message, a changing code (e.g. a rolling code) of the first message, portions thereof, or other portions of the first message such as a payload. Alternatively, the first device may indicate the offset position at which a second device is to include an offset code sequence within a response message by sending a separate signal. In still other forms, the second device may be pre-configured to include the offset code sequence at the offset position. The second device may then receive the first message and validate the first message, such as by locating and comparing fixed and/or changing codes from the first message to stored code values within the second device. The second device determines, based on the first message (or other information), the offset position of the response message at which to include the offset code sequence containing identifying information.

In some forms, the offset code sequence is separated from a message header of the response message by a leading sequence comprising a sequence of bits which may be random or predetermined. That is, the offset positioning of data of interest (e.g. a changing or rolling code) may be achieved by inserting a placeholder (e.g. a bit or bits, or a byte or bytes) into at least one place or position within a message such that the data of interested is shifted into a particular place or position. Similarly, the offset positioning may be achieved by removing a placeholder in its entirety or partially.

The first and/or second device may determine the position of the offset code sequence, in some embodiments, by the number of bits or bytes between the end of a preamble or header portion and the beginning of the offset code sequence. By adjusting the number of bits or bytes between the header and the offset code sequence relative to the position where the offset code sequence would normally be found, by either removing bits to shift the offset code sequence toward the header or adding bits to shift the offset code sequence away from the header, information contained within the offset code sequence can be obscured and made unreadable by devices that do not know the starting position of the offset code sequence. The number of random or predetermined bits between the header and the offset code sequence of the second message may be determined based on the first message in some embodiments. In one example, the number of bits may be determined based on a fixed code portion of the first message, leading to a random sequence composed of the determined number of bits being inserted between the header portion and the offset code sequence of the response. In another example, the number of bits may be determined based on a changing code portion of the first message. In yet another example, a first message may include a first fixed code, a first changing code, and a first payload, and a position for an offset sequence in the second message relative to a specific marker (e.g. a "zero" point) within the second message may be calculated collectively based on the identity of specific bits from the first fixed code, specific bits from the first changing code, and specific bits from the first payload. The calculated position is then determined by applying an algorithm to the specific bits and adding the result to the marker in order to determine the starting point for the offset sequence. The bytes between the marker and the starting point of the offset sequence may then be filled with random data. The calculated position may indicate a location within an encrypted version of the second message where relevant information from the second device (e.g. fixed and changing codes from the second device) is placed, or may indicate a location within a protocol data unit where relevant information may be found after decryption and/or reconstruction. Alternatively, or in addition, a specific sequence of bits (rather than a specific number of random bits) added or removed between the header portion and offset code sequence may be determined based on the first message. In one example, the sequence of bits added may be determined based on a fixed code portion of the first message. In another example, the sequence of bits added may be determined based on a changing code portion of the first message. In addition to the offset code sequence, the response message from the second device may comprise identifying information relating to the second device, such as a second fixed code and/or a second changing code. This identifying information may be included within the offset code sequence of the response message that is located at the offset position determined based on the first message.

When the first device receives the response message containing the offset code sequence, the first device may locate the offset position of the offset code sequence based on information relating to the first message (e.g. by utilizing positioning information used to format the first message or by calculating the offset position from the first message) and then read the offset code sequence in order to determine the identifying information of the second device. This permits the first device to validate the response (e.g. by comparing a fixed code and/or changing code from the response message to stored code values). The first device also may transmit a third or subsequent message upon validation of one or more received messages. In the foregoing example, the first device may be a controller and the second device an apparatus to perform a function when instructed by the controller or, alternatively, the first device may be an apparatus controlled by the second device. The first and second devices may each, in some embodiments, transmit and/or receive multiple messages having content offset from a specific portion or position of their respective messages according to prescribed rules. In some embodiments, multiple segments of a single message are offset from specific portions or positions of the message, each according to a different rule.

In some forms, two devices communicating with one another may each instruct the other device to respond with offset code sequences. Furthermore, the offset positioning may be asymmetric. For example, messages from the second device to the first device may be communicated with a first offset positioning (e.g. shift left two bits, start at bit position x) whereas messages from the first device to the second device may be communicated with a second offset positioning (e.g. shift right five bits, start at bit position y) that is different from the first offset positioning. Additionally, the offset positioning may be variable from one messaging session to another.

In some forms, the offset position of an offset code sequence is based on at least one of a first changing code or fixed code from a previous message. In other forms, the position is determined from a combination of a fixed code and a changing code, from a separate portion of the previous message (e.g. a payload portion), or from a combination of fixed code, changing, code, and other portions of the previous message. The offset position of the offset code sequence may in some forms be based on only a portion of the fixed and/or changing code. In some forms, the content of the offset code sequence comprises another fixed code and/or changing code, and may be configured to cause a receiving device to offset a portion of one or more portions of a subsequent message based on the content of the offset code sequence.

An offset code sequence of a message may be located by a receiving device by ignoring a leading sequence, or a portion thereof, that precedes the offset code sequence in order to read substantive information from the offset code sequence. For instance, a receiving device may be instructed, based on information from a previous inbound or outbound message, or other information, to skip a specific number of bits following the start of the received message (or a specific number of bits following a header or other portion of the received message). Thus, regardless of whether the offset code sequence has been shifted away from the message header (by inserting or adding to a leading sequence) or toward the header (by removing part or all of a leading sequence), the receiving device is able to locate the offset code sequence based on the position of the offset code sequence relative to another portion of the message. If the receiving device has not been properly instructed to skip a correct number of bits or bytes, it will begin reading information at an improper position and be incapable of correctly processing the offset code sequence. For instance, if bits from a leading sequence have been removed in order to shift the offset code sequence toward the header and the receiving device does not adjust its reading frame accordingly, it will begin reading information part way through the offset code sequence, or potentially after the offset code sequence. On the other hand, if bits are added between the header and offset code sequence, the receiving device will begin reading information from within the leading sequence and potentially omit bits toward the end of the offset code sequence if the receiving device does not properly adjust its reading frame.

In order to correctly locate the offset code sequence, the receiving device may in some forms acquire information relating to an offset position that defines a starting point for the offset code sequence. In other forms, the offset position identified by the receiving device is a message segment of a specific length consisting of a predefined number of bits, within which the offset code sequence is located. In addition to containing a leading sequence that precedes an offset code sequence, a message may further include a trailing sequence following the offset code sequence. The trailing sequence may in some forms have a length based on the length of the leading sequence so that a total length of the leading sequence, offset code sequence, and trailing sequence together is a fixed number of bits. In other words, the offset code sequence may comprise a sequence of bits that is shifted within a larger sequence of bits so that the number of bits preceding and following the offset code sequence change based on instructions known to both the sending and receiving device. The reference point for determining this shifting of the offset code sequence within the larger sequence may be a first bit of the larger sequence, a last bit of the larger sequence, another bit position within the larger sequence, or even a bit position external to the larger sequence. Determining the position of the offset code sequence may involve identifying a specific bit position for the beginning and/or end of the offset code sequence, or alternatively identifying a magnitude and direction of shifting relative to a specific bit position (i.e. +/–"x" number of bits from a default position or baseline).

There are multiple ways in which a first device may determine the position of specific message content when it has instructed a second device to respond with that message content shifted to a specific position or in a specific manner. For instance, the first device may determine the position of the specific message content prior to transmitting the first message, so that the first device is already configured to determine the position upon receipt of a responsive communication without taking further action. In some forms, the first device may even determine the position at which responsive messages are to include the specific content prior to generating or configuring the first message, so that the intended position of the specific content is used to determine the configuration of the first message. Alternatively, the first device may configure the first message prior to determining the offset position, or even after transmitting the first message, and in some forms may use the first message to determine the position at which to locate the specific content in a similar manner to which the other device uses the first message to determine the position in which to include the specific content.

In some forms, an apparatus is provided that includes a controller circuit, a transmitter in operative communication with the controller circuit, a receiver in operative communication with the controller circuit, and a user input device in operative communication with the controller circuit, wherein the controller circuit is configured to (i) in response to detecting an input at the user input device, control the transmitter to transmit a first message that includes at least a first fixed code and a first changing code, the first message including an indicator to the second device to include in a second message an offset code sequence at an offset position within the second message, at least one of the first changing code or first fixed code being usable by a message recipient to determine the offset position relative to a header of the second message; (ii) receive the second message including the offset code sequence from the second device; (iii) locate the offset position within the second message and read the offset code sequence; (iv) validate the response message by comparing the second fixed code and the second changing code to stored code values; and (v) in response to validating the response, transmit a third message including at least the first fixed code and a changed version of the second changing code, wherein the third message is configured to effect performance of an action by the second device. The offset code sequence within the second message may be preceded or pre-pended by a leading sequence, the leading sequence comprising random bits and having a length determined based on the first message, and the controller circuit may be configured to locate the offset code sequence by proceeding directly to the beginning of the offset code sequence based on its position relative to a reference point within the second message or otherwise ignoring the leading sequence. Alternatively, the offset code sequence within the second message may be shifted to an earlier position (e.g. a position that is more forward or closer to initial message data such as a header or preamble) in the second message by removing some or all of a leading sequence, and the controller circuit may be configured to locate the offset code sequence based on its position relative to a reference point within the second message. The controller circuit may be further configured to determine a second offset position within the third message at which to include a second offset code sequence, the second offset position based on the response message. The controller circuit in some embodiments may be further configured to include the first fixed code and the changed version of the second changing code within the second offset code sequence.

A first device may inform a second device of a start position or reading frame of positionally-shifted message content via instructions that identify a specific position or a specific direction and magnitude of shifting for the offset code sequence. Alternatively, the second device may include logic that determines the position for the offset code sequence based on characteristics of a message from the first device, such as the identity of bits at specific positions within a sequence. In some forms, a first device may inform a second device of the appropriate start position and/or reading frame in a separate message from a message that triggers a response from the second device. In still other forms, a second device is pre-programmed to be synchronized with a paired first device so that the first device automatically accounts for positionally-shifted content of incoming messages.

Messages with positionally-shifted content may also be employed in a communication session between devices, and the shifting may be varied from one message to another in a session and/or from one session to another. By including one or more messages containing positionally-shifted content, an intercepted transmission will be useless unless the intercepting entity is able to determine the appropriate reading frame for specific message content. By setting devices to determine the position shifting based on a variable portion of a related or previous transmission, or a portion or derivative thereof, the start position for particular sequences can vary from operation to operation, further increasing the level of security.

In some forms, an apparatus as described herein may include a non-transitory computer readable medium having stored thereon instructions. In some forms, the instructions, when executed by a controller circuit, cause the controller circuit to perform operations comprising: configuring a first message that includes at least a first fixed code and a first changing code; receiving a second message including an offset code sequence; locating the offset code sequence within the second message using at least one of the first message, the first fixed code, and the first changing code; determining a second fixed code and a second changing code based on the offset code sequence and validating the response message by comparing the second fixed code and the second changing code to stored code values; and configuring a third message including at least the first fixed code and a changed version of the second changing code.

In some embodiments, a system may include a first device configured to communicate with a second device and trigger a subsequent response by the second device. The first device may be, for instance, a handheld or vehicle mounted transceiver, and may be user-operated or triggered by a geofence, proximity detection, or other variables. The first device may in some forms be generally configured for developing and transmitting via wireless signals a first encrypted message comprising a fixed code and a changing or variable code (such as a rolling code). The changing or variable code is changed with each actuation of the transceiver. The fixed code is static and remains the same for each actuation of the transceiver. A second device, for example an operator such as a motorized garage door opener, receives the encrypted message, validates the message by comparing the fixed code and the changing or variable code to stored values, which are preferably stored in a computer memory physically incorporated into the second device, and upon validation sends a response signal including at least a second encrypted message having a second fixed code and a second changing code. The first device then receives and attempts to validate the second encrypted message, and in some embodiments, is configured to transmit a third encrypted message to the operator device, the third encrypted message including the first fixed code and a changed version of the second changing code. This third encrypted message is configured to effect performance of an action by the operator device, such as lifting or lowering a moveable barrier structure.

In some forms, a system of secure communication between a first device and a second device includes multiple communications in which both devices provide identifying information so that the two devices may each authenticate the other device in the process of the first device controlling the second device to effect an action. In some embodiments, the first device comprises a controller circuit; a transmitter in operative communication with the controller circuit; a receiver in operative communication with the controller circuit; and a user input device in operative communication with the controller circuit. The controller circuit of the first device may be configured to, in response to detecting an input at the user input device, control the transmitter to transmit a first encrypted message that includes at least a first fixed code and a first changing code; receive through the receiver a response from the second device, wherein the response comprises a second encrypted message including a second fixed code and a second changing code; validate the response by comparing the second fixed code and the second changing code to second stored code values; and in response to validating the response, control the transmitter to transmit a third encrypted message including at least the first fixed code and a changed version of the second changing code, wherein the third encrypted message is configured to effect performance of an action by the second device. The second device may in some embodiments comprise a controller circuit; and a transmitter in operative communication with the controller circuit; a receiver in operative communication with the controller circuit. The controller circuit of the second device may be configured to enable receiving the first encrypted message by the second device's receiver; validate the first encrypted message by comparing the first fixed code and the first changing code to stored code values; determine when to transmit a response; in response to validating the first encrypted message, control transmitting the response from the second device's transmitter; enable the second device's receiver to receive the third encrypted message; validate the third encrypted message by comparing the first fixed code and the changed version of the second changing code to stored code values; and effect performance of an action in response to validating the third encrypted message.

In some embodiments, at least one time window is associated with one or more encrypted messages and provides yet another layer of security and minimizes the opportunity for third parties to intercept transmissions and utilize the fixed and changing codes without the device owner's consent. Determination of the time window may be made relative to specific actions (such as activation of the first device, receipt of a transmission by the second device, etc.), or alternatively may be based on an absolute time measurement (e.g. by referencing a clock to determine the beginning and end of the window). If absolute time measurements are used, the first device and devices with which it is in communication should be synchronized so that their absolute time measurements are essentially the same. In some such embodiments, the first and second device each contain timers in operative communication with their respective controller circuits, and upon actuation the first device determines a time window in which to expect to receive a response in addition to transmitting a first encrypted message including at least a first fixed code and a first changing code. In some embodiments, the time window may be determined based on one or more code portions used to create the first encrypted message (such as the changing code portion of the message or one or more portions thereof) or based on the encrypted form of the message or one or more portions thereof. The second device receives and decrypts the first encrypted message and validates the message by comparing the fixed code and the changing or variable code thereof to stored values. The second device also determines a second time window in which to transmit a response to the user-operated transceiver based on the encrypted message. The second time window may be the same as or within the time window determined by the first device and may or may not be determined using the same portion of the encrypted message. The second time window may be a discrete point in time that lies within the first time window.

In some embodiments employing a time window, after the second device validates the first encrypted message, the second device sends a response signal to the first device within the second time window. The response signal includes at least a second encrypted message created from a second fixed code and a second changing code, wherein the second changing code may be, but is not necessarily, independent from the first changing code. If the second encrypted message is received by the first device within the first time window, the first device will attempt to validate the second encrypted message by comparing the second encrypted message's fixed code and changing or variable code to a second set of stored code values. In some embodiments, the first device may compare the time of receipt of the second encrypted message to the first time window, only proceeding to analyze signals or messages that are received within the first time window. Alternatively, to conserve power, the first device may turn on and enable a receiver element at the beginning of the time window and shut off the receiver element at the end of the time window so that the first device is only able to receive transmissions from the second device within the first time window. In such embodiments, the second encrypted message will be entirely ignored if sent and received outside of the first time window. Upon validating the response from the second device, the first device in some embodiments may be configured to transmit a third encrypted message including the first fixed code and a changed version of the second changing code. This third encrypted message is configured to effect performance of an action by the second device, such as lifting or lowering a moveable barrier.

The fixed and variable codes may be of any selected length and may be adapted or altered in various ways in order to add additional layers of security. In some examples, the transmitter may be configured to produce a frame of a specified number of bits comprising a fixed portion of the code and a second frame comprising a variable portion of the code. In some embodiments, the variable portion of the code, which may be a rolling code, may then be mirrored to provide a mirrored rolling code. The mirrored rolling code may then have its most significant bit "deleted" by setting it to zero. The transmitter may then convert the fixed code and the mirrored rolling code to a three-valued or trinary bit fixed code and a three-valued or trinary bit rolling code. To provide even further security, in some embodiments the fixed code and the rolling codes may be shuffled or interleaved so that alternating bits are comprised of a fixed code bit and a rolling code bit. A single synchronization and/or identification pulse may proceed the first and second frames to indicate the start of the frame and whether it is the first frame or the second frame.

Additionally, or alternatively, in some embodiments encryption may include providing a variable code and a plurality of differing data bit order patterns, providing a plurality of differing data inversion patterns, selecting a particular one of each of the data bit order patterns and the data inversion patterns to provide selected patterns, and transmitting at least a part of the encrypted variable code using the selected patterns as transmission characteristics. In some forms, selecting a particular one of each of the data bit order patterns and the data inversion patterns to provide selected patterns comprises using the variable code to select the particular data bit order pattern and data inversion pattern to provide the selected patterns.

Also provided is a method of pairing a first device and a second device to establish secure communication between the first device and the second device to effect an action by the second device. A first device transmits to a second device a first encrypted message that includes at least a first fixed code and a first changing code. The second device receives the first encrypted message while the second device is in a "learn" mode in which it is waiting for signals from a transmitter without information regarding the current version of the changing code of the first device. While in learn mode the second device stores the first encrypted message. In some embodiments, the second device may have been placed in learn mode manually by a user, such as by pressing a button, switch, or lever on the second device, and thus in some embodiments may require simultaneous manual activation of both the first and second device. The second device receives and validates the third encrypted message by comparing the first fixed code and the changed versions of the first changing code to stored code values from the first encrypted message (first fixed code and first changing code), and upon validation (by confirming that the changed version of the first changing code is one change forward of the changing code from the first encrypted message) the second device then transmits a fourth encrypted message including the second fixed code and a second changing code (which may be independent of the first changing code). The first device receives the fourth encrypted message, validates the fourth encrypted message by comparing the second fixed code and the second changing code to the response stored by the first device, and stores the second fixed code and the second changing code in response to validating the fourth encrypted message.

The present system provides advantages over previous garage door operator systems and previous rolling code systems. Some systems according to the invention provide enhanced security through bidirectional communication in which first and second devices both transmit and receive independent codes to validate a transaction between devices both on the user end and operator end. Some embodiments provide enhanced security by linking information relating to subsequent transmissions to the encrypted transmissions, and entail receipt of responsive transmissions with specific content located at specific positions within the transmission as a prerequisite for code validation. These enhanced security measures may also be used in methods of pairing and/or synchronizing devices.

BRIEF DESCRIPTION OF THE DRAWINGS

FIGS. 8A-F are flow charts showing examples of operation of a receiver of one of the first and second devices;

FIG. 8H is an example message diagram in accordance with one example of an encrypted message.

Figure 1:
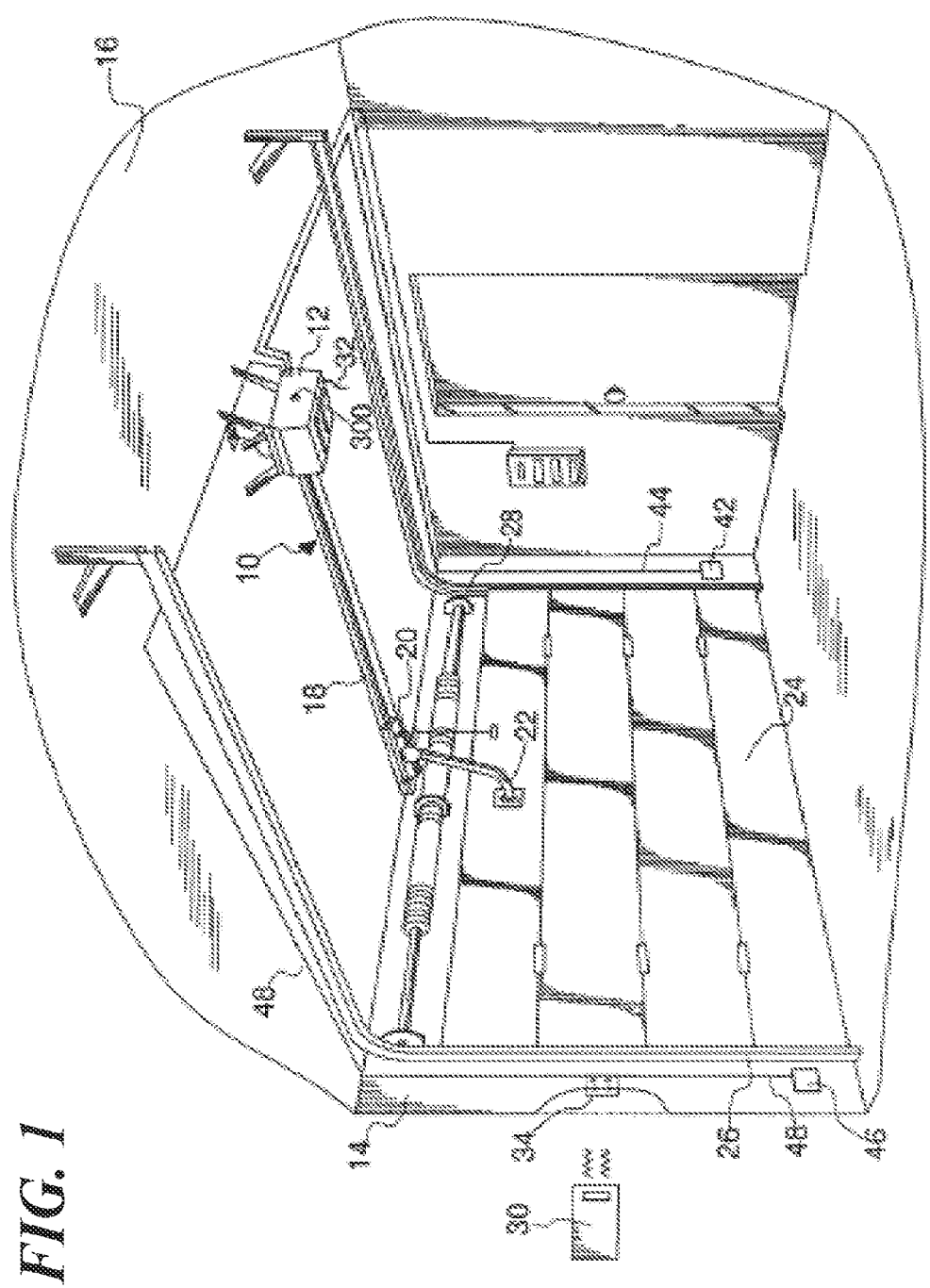
FIG. 1 is a perspective view of an example moveable barrier operator system that receives control signals from a user-operated transceiver.

Skilled artisans will appreciate that elements in the figures are illustrated for simplicity and clarity and have not necessarily been drawn to scale. Common but well-understood elements that are useful or necessary in a commercially feasible embodiment may be omitted for simplicity and/or clarity. It will further be appreciated that certain actions and/or steps may be described or depicted in a particular order of occurrence while those skilled in the art will understand that such specificity with respect to sequence is not actually required.

DETAILED DESCRIPTION

The systems and methods described herein include a user-actuated first device, for instance a handheld or vehicle mounted transceiver, generally configured for developing a first encrypted message comprising a fixed code and a changing or variable code (such as a rolling code). The first message (as well as subsequent messages) may in some cases be in a multi-message format that breaks up data so that it is sent as multiple messages. The changing or variable code is changed with each actuation of the transceiver according to a set sequence or protocol accessible by the first device and a second device with which it communicates. The fixed code remains the same for each actuation of the first device. The second device includes an operator mechanism, such as a motorized garage door opener, to induce one or more actions when commanded by the first device. The first and second device may be configured to communicate with one another by various techniques, for example a wired communication path, radio frequencies, or any variety of proprietary wireless platforms.

In some embodiments, the second device receives the encrypted message from the first device, validates the message by comparing the fixed code and changing or variable code to stored values and, upon validation, sends a response signal including at least a second encrypted message having a second fixed code and a second changing code that is independent from the first changing code. The stored values may represent, for instance, fixed and changing values from prior operations with a sequence or algorithm associated with the changing code to determine changing code values. In some embodiments, the second device may recognize a plurality of changing code values as valid in order to account for accidental or otherwise ineffective actuation of the first device (such as when outside of the range of the second device or when interference prevents normal communication with the second device).

The first device receives and attempts to validate the second encrypted message, and in some embodiments, is configured to transmit a third encrypted message to the second device, the third encrypted message including the first fixed code and a changed version of the second changing code. This third encrypted message is configured to effect performance of an action by the second device, such as lifting or lowering a moveable barrier. Thus, communication between the devices may involve bidirectional validation of messages wherein each of two devices are configured to both transmit and receive messages and compare them to stored values, such as values from prior communications between devices. The communication between the devices may, in some embodiments, involve additional exchanges of messages in order to further improve security, for instance transmission and validation of fourth and fifth encrypted messages containing fixed codes and changing codes.

Referring now to the drawings and especially to FIG. 1, a moveable barrier operator system 10 is provided that includes moveable barrier operator 12 mounted within a garage 14 and a handheld transceiver 30. The operator 12 is mounted to the ceiling 16 of the garage 14 and includes a rail 18 extending therefrom with a releasable trolley 20 attached having an arm 22 extending to a multiple paneled garage door 24 positioned for movement along a pair of door tracks 26 and 28. The handheld transceiver unit 30 is adapted to send signals to and receive signals from the operator 12. An antenna 32 may be positioned on the operator 12 and coupled to a receiver as discussed hereinafter in order to receive transmissions from the handheld transceiver 30. An external control pad 34 may also be positioned on the outside of the garage 14 having a plurality of buttons thereon and communicate via radio frequency transmission with the antenna 32 of the operator 12. An optical emitter 42 may be connected via a power and signal line 44 to the operator 12 with an optical detector 46 connected via a wire 48 to the operator 12 in order to prevent closing of the door 24 on a person or object inadvertently in the door's path. A switch 300 may be provided for switching between modes, such as operating mode and learn mode.

Figure 2:
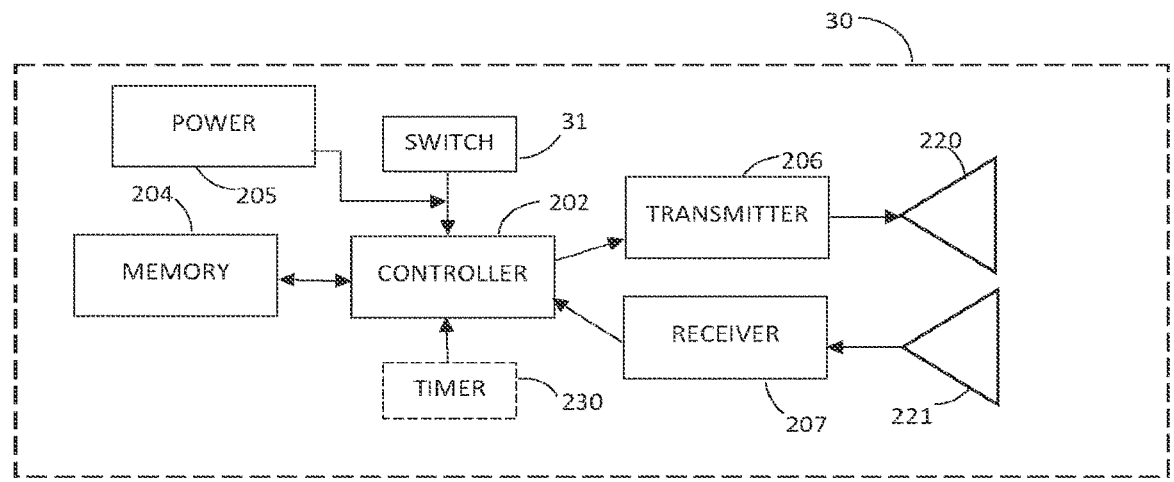
FIG. 2 is a block diagram of an example of the user-operated transceiver of FIG. 1.

Referring now to FIG. 2, a block diagram of the transceiver 30 is provided. The transceiver 30 includes both a transmitter 206 and receiver 207 (which may be combined into a single mechanism) in operative communication with antennas 220 and 221, respectively. The antennas may be positioned in, on, or extending from the user operated transceiver 30, wherein the transmitter 206 and receiver 207 are configured for wirelessly transmitting and receiving transmission signals to and from the moveable barrier operator 12, including transmission signals that contain a first rolling access code with a fixed code portion and a rolling code portion. In some embodiments, both the transmitter and receiver may communicate with a single antenna or multiple antennas, and in some embodiments both devices may be configured to be a single transceiver device in communication with a single antenna. The user-operated transceiver 30 also includes a controller 202 in operative communication with the transmitter 206 and a memory 204 and is configured for processing data and carrying out commands. The memory may be, for instance, a non-transitory computer readable medium, and may have stored thereon instructions that when executed by a controller circuit cause the controller circuit to perform operations. A power source 205 is coupled to the controller 202 and/or other components, and may be routed in some embodiments so that a switch 31 couples/decouples the power source to other components so that power is supplied only upon activation of the switch 31 or a specified time thereafter. The controller 202 is configured to generate and cause the transmitter 206 to transmit a first rolling access code, including at least one fixed code portion and at least one changing or rolling code portion for the transmission signal, and the receiver 207 is configured to receive responsive transmissions. A timer 230 may be provided in some embodiments that is in communication with the controller 202 and provides a way to determine the time of incoming and outgoing signal transmissions. The timer may also provide reference for the controller 202 to enable and disable the transmitter 206 and/or receiver 207 of the device in connection with some embodiments. The memory 204 is connected for operative communication with the controller 202 and is configured to store codes and in some embodiments other information for outgoing transmissions. The memory 204 is further configured to store fixed and/or changing or variable code values for comparison to incoming transmissions. The switch 31 may include one or more user-operable switches for inputting commands to the transceiver 30, for example to issue a barrier movement command or a learning command. The switch 31 may be associated with a button, lever, or other device to be actuated, for example by a user's hand or other actions, events, or conditions. As other examples, the switch 31 may be voice operated or operated by a user contacting a touch-sensitive screen as the location of an object displayed on the screen.

Figure 3:
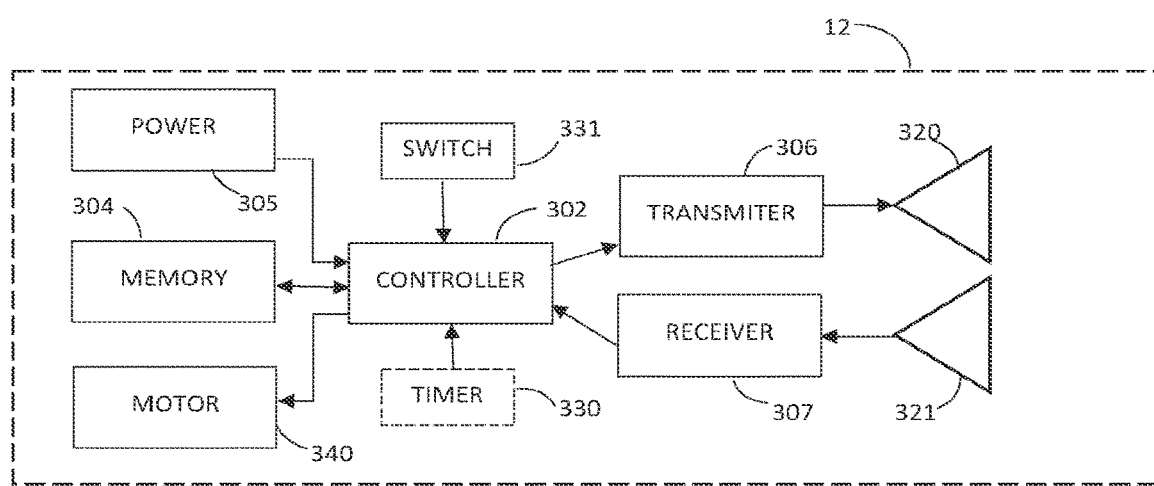
FIG. 3 is a block diagram of an example of the moveable barrier operator of the system of FIG. 1.

Referring now to FIG. 3, in one example, the operator 12 includes a controller 302 in communication with a memory 304 and is configured for storing and retrieving data to and from the memory 304 as well as processing data and carrying out commands. A power source 305, such as an AC power conduit, battery, or other known source, supplies electricity to the controller 302 in order to allow operation. The operator 12 also includes a wireless transmitter 306 and receiver 307 (or combination transceiver device) in operative communication with the controller 302. As shown, the transmitter 306 communicates with a first antenna 320 and the receiver 307 communicates with a second antenna 321, but both devices may communicate with a single antenna or multiple antennas, and in some embodiments the operator 12 may be configured to have a single transceiver device in communication with a single antenna. The antennas may be positioned in, on, or extending from the moveable barrier operator 12. In this regard, signals, such as radio frequency or other wireless transmission carriers, may be sent to and received from the user-actuated transceiver 30 according to a variety of frequencies or modulations. Signals may be modulated in a number of different ways; thus, the transceiver 30 and moveable barrier operator 12 may be configured to communicate with one another via a variety of techniques. The controller 302 of the operator 12 is also in communication with a motor 340 in order to carry out an operation such as lifting or lowering a garage door; sliding, swinging, or rotating a gate; or otherwise moving or repositioning a barrier structure. One or more switches 331 may be provided to override the controller 302 or place the controller in and out of a learning mode in which the operator 12 may be paired with a user-operated device by exchanging and storing messages.

The term controller refers broadly to any microcontroller, computer, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

Generally, the controllers 202 and 302 may be configured similarly or independently, and each can include fixed-purpose hard-wired platforms or can comprise a partially or wholly programmable platform. These architectural options are well known and understood in the art and require no further description here. The controller can be configured (for example, by using corresponding programming as will be well understood by those skilled in the art) to carry out one or more of the steps, actions, and/or functions described herein, and can store instructions, code, and the like that is implemented by the controller and/or processors to implement intended functionality. In some applications, the controller and/or memory may be distributed over a communications network (e.g. LAN, WAN, Internet) providing distributed and/or redundant processing and functionality. In some implementations, the controller can comprise a processor and a memory module integrated together, such as in a microcontroller. One or more power sources may provide power to each controller, and may be of any known type.

When a user actuates the switch 31 of the user-operated transceiver 30, such as by pressing a button designated as performing a particular action, the controller 202 activates the transmitter 206 to transmit through antenna 220 a message based on information stored in the memory component 204. The message is received by the receiver 307 of the operator 12 via antenna 321, and communicated to the operator's controller 302. In some embodiments, the controller 302 verifies the message by comparing it to stored information from the operator's memory module 304, and upon verification the controller 302 is configured to cause transmission of a response signal from the transmitter 306 through antenna 320.

Upon receiving the response of the operator 12 through receiver 207, the user-actuated transceiver 30 may validate the response by comparing the response or one or more portions thereof to stored information in its memory module 204. Upon validation of the response, the user-actuated device 30 may transmit another message through transmitter 206 to the operator 12. This third message is configured to cause the operator's controller 302 to activate a motor 340 in order to carry out a function associated with activation of the user-actuated device. The transceiver 30 may include multiple buttons, levers, switches, displays, microphone(s), speaker(s), or other inputs associated with different tasks to be carried out by the operator 12.

In another example, pairing of the moveable barrier operator 12 to a user-actuated transceiver may be performed. The receiver 307 of the operator 12 is configured to receive an authorization signal indicating that it is authorized to communicate with the user-actuated transceiver 30 and to provide an indication that it received the authorization signal to the controller 302. One or more switches 331 may be provided in order to turn on and/or otherwise permit the receiver 307 to receive the authorization signal. In response to receiving the authorization signal, the controller 302 is configured to generate a first rolling access code and to store a representation of the first rolling access code in the memory device 304. The controller 302 is configured with the transmitter 306 to transmit a transmission signal including the first rolling access code to the user-actuated device 30. The receiver 307 also receives a transmission signal from the user-actuated transceiver 30 including a second rolling access code, as described further below. In this example, the receiver 307 provides the transmission signal to the controller 302, which compares the second rolling access code with the representation of the first rolling access code stored in the memory device 304.

Figure 4A:
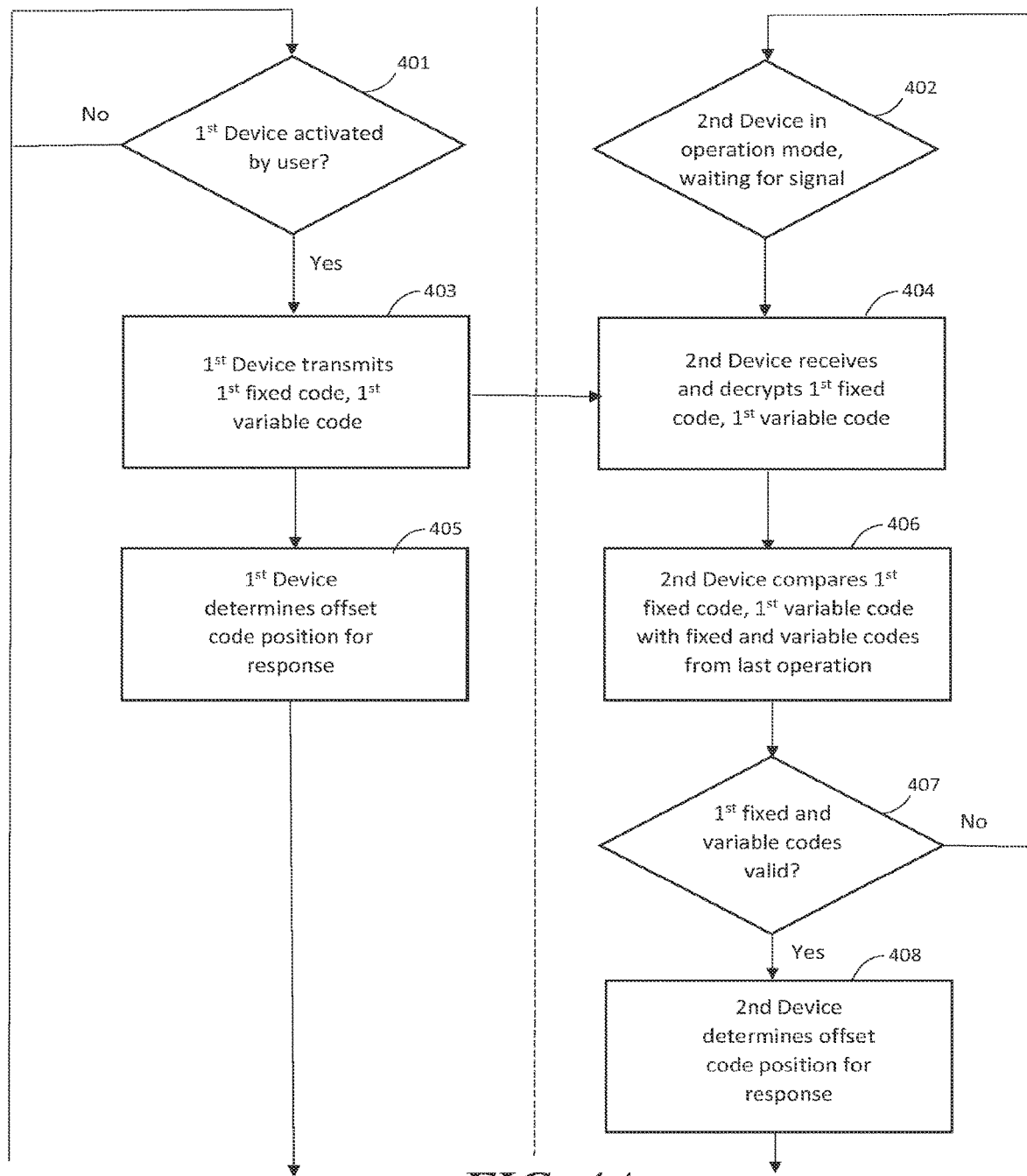
FIGS. 4A-C are flow diagrams showing an example communication flow between a first device and a second device during normal operation.
Figure 4B:
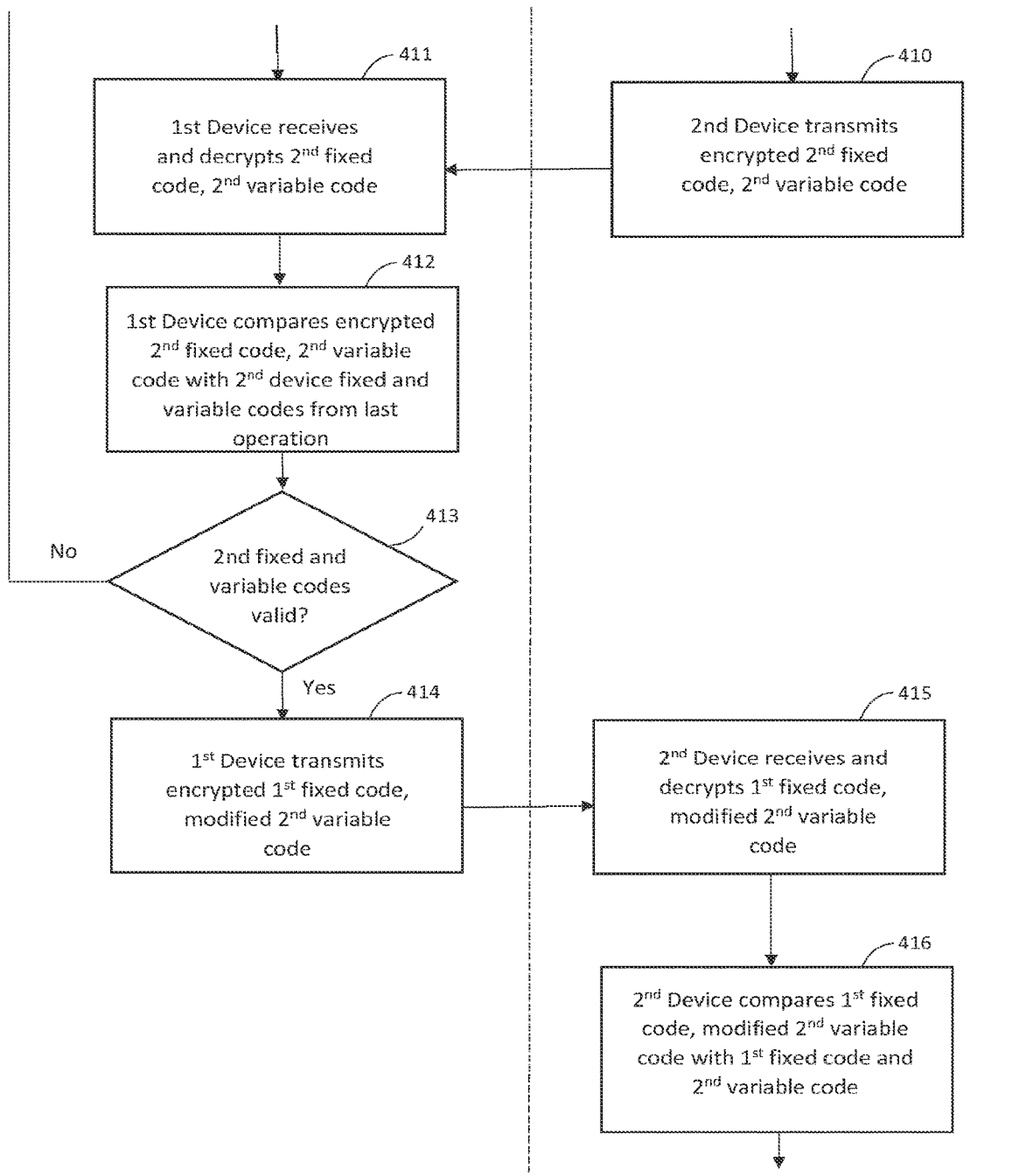
Figure 4C:
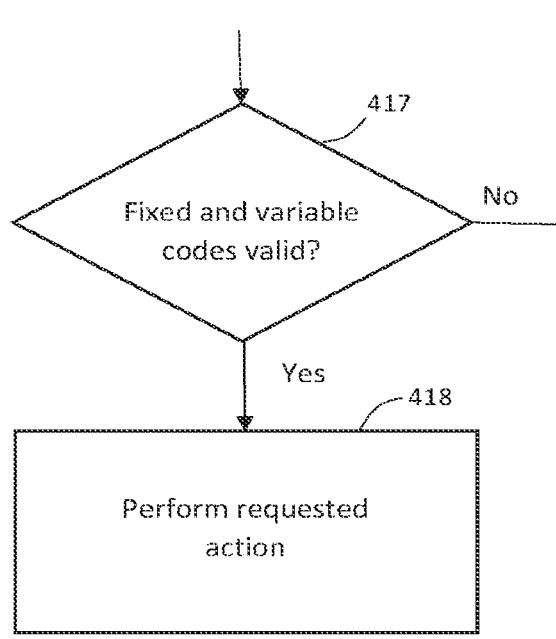

FIGS. 4A, 4B, and 4C are interconnected flow charts that demonstrate steps of one example of a process in which signals are exchanged between first and second devices to verify authorization and carry out an activity. Steps to the left of the central dashed line relate to a first device, such as a user-operated remote device, while steps to the right relate to a second device, such as a moveable barrier operator. For example, the first and second devices may be the transceiver 30 and the operator 12 discussed previously. In this example, a previous operation such as a pairing procedure or an operation sequence has been performed at an earlier time so that each of the first and second device have stored information received from the other device; a first-time operation of the device in the form of a pairing or synchronization sequence will be explained further below in connection with FIGS. 5A-5C.

Initially, the first and second devices both have stored in their memories a first fixed code and first variable code from the immediately previous operation involving the first device, as well as a second fixed code and second rolling code from the immediately previous operation involving the second device. The first device assesses at step 401 whether it has been activated. For instance, a user pressing a button on the first device may complete an electrical circuit or effect a measurable change in at least one component of the first device. When the first device has not been activated, it continues to await activation. Once activated, the first device transmits 403 a first message that includes at least a first fixed code and a first changing or variable code that represents a modification from the first changing code in the immediately previous operation. The first fixed code and/or first variable code are now stored within the memory of the first device, and may be encrypted using one or more encryption methods. The encryption methods are not particularly limiting, and may include one or more types of public key or private key encryption, block ciphers, stream ciphers, and other techniques. In some embodiments, encryption may comprise using a predetermined number of bits of the changing code as a basis for selecting a particular data bit order pattern and particular data inversion pattern. The first device also specifies or determines 405 an offset code position for an anticipated response (in this instance, a position in a forthcoming message from the second device wherein the position is offset from a preamble or header of the message and where fixed and variable codes from the second device will be located). This determination may take place before or after transmission of the message by the first device. In some embodiments, the determination of the offset code position by the first device may be made prior to generating the first message transmitted at step 403, and information regarding the offset code position may be used in generating the first message. Alternatively, in other embodiments, the first device may generate the first message (or portions thereof) and then determine the offset position based on characteristics of the first message. In some embodiments, the determination of the offset code position is made randomly (e.g. using a random or pseudo-random number generator) or may be based on at least a portion of the first encrypted message or from at least a portion of the unencrypted variable code, or both. The determination of the offset code position may also be made based on a fixed code or other portion of the encrypted or unencrypted versions of the first message.

Meanwhile, the second device has been placed in operation mode and awaits 402 a signal to effect an action, and upon receiving 404 the first message from the first device, decrypts the message to obtain the first fixed code and first variable code. The second device then stores the first fixed code and first variable code, and validates the first fixed code and first variable code by comparing 406 them to stored code values. In this step, the first fixed code and first variable code from the encrypted message are compared to the first fixed and variable code from the previous operation. If the fixed codes match and the first variable code from the encrypted message matches the previous variable code as modified according to a set of established rules for the variable code (e.g. matches a subsequent value from a predetermined sequence or algorithm), the first encrypted message will be considered validated. If the decrypted code values do not match the stored code values, the second device ignores the first message and waits 402 for further signals. On the other hand, if the code values are valid in 407, the second device determines 408 an offset code position, based on the first encrypted message, in which to include the second fixed code and second changing/variable code from the second device within the second message.

In response to validating the first encrypted message, and after determining the offset code position, the second device transmits a response 410 in the form of a second message. The second message comprises the second encrypted message including the second fixed code and the second changing/variable code (that is, in the depicted embodiment, independent from the first changing code and represents a modified version of a variable code from the immediately previous operation). The second fixed code and second variable code are positioned within the second message at the determined offset code position so that a device (e.g. the first device) receiving the second message must be capable of correctly locating the offset code position in order to accurately determine the second fixed code and second variable code. The second fixed and modified second variable code values are also stored in the second device's memory, so that at this stage the second device memory contains the first fixed and variable code from the previous operation, the second fixed and variable code from the previous operation, the first fixed and variable code from the first encrypted message from the first device, and the second fixed and variable code from the encrypted response.

The first device will receive 411 and decrypt the second encrypted message, which includes the second fixed code and second changing/variable code. The first device determines where to locate the second fixed code and second changing/variable code, either by identifying a position on the encrypted version of the second message where encrypted versions of the codes are located and then decrypting all or a portion of the second message to reveal the second fixed code and second changing/variable code, or by first decrypting the second message and then identifying the position of the second fixed code and second changing/variable code. If the first device has not determined the same offset code position that the second device determined when creating the second encrypted message, the first device will be unable to locate the beginning of offset portion and thus cannot properly read the second fixed code and changed variable code from the second encrypted message. If, however, the first device has determined or otherwise knows, retrieves, or uses the appropriate offset code position for the second encrypted message, the first device will be able to successfully identify the second fixed and changed variable code and store those codes in the first device's memory, along with the second fixed and variable code from the previous operation and the first fixed and variable code from the first encrypted message. The first codes from the previous operation are no longer needed, and may be deleted from the memory.

The first device then compares 412 the second fixed code and second variable/changing code with fixed and variable codes from the previous operation stored in the memory of the first device. If the second fixed code matches the fixed code from the prior operation and the second variable code matches the prior changing code as modified according to a set of established rules for the changing code, the response message is validated. If the second fixed and variable codes are determined 413 valid, the first device transmits 414 a third encrypted message including at least the first fixed code and a changed version of the second changing code. If the first device is unable to validate the response from the second device, the process ends and the first device returns to awaiting 401 subsequent activation. The position of the first fixed code and changed version of the second changing code may be offset within the third message based on information from the first or second message in a manner similar to the offsetting of information within the second message based on information from the first message as described above, and the offsetting of codes in the third message may be the same as or different than the offsetting of codes in the second message.

When the second device receives 415 the third encrypted message, the second device decrypts 415 the message to determine the first fixed code and the changed version of the second variable code. The second device also determines the location of the first fixed code and the changed version of the second variable code if they have been offset within the third message. The values are stored in the second device memory, which now contains the first fixed and variable codes from the previous operation, the first fixed and variable code from the first encrypted transmission, the second fixed and variable codes from the previous operation, the second fixed and variable code from the second encrypted (response) transmission, and first fixed code and changed second variable code from the third encrypted message. The second device then compares 416 the first fixed code and the changed versions of the second variable code to stored code values comprising the first fixed code and unmodified second variable code in order validate 417 the third encrypted message. While the validation step may have a forward window of values that are acceptable (validation occurs when the received version of the changing code is any one of the next several (e.g. twelve) values expected in the sequence), security may be increased by reducing the size of—or completely eliminating—this forward window. Therefore, in some embodiments the third encrypted message is validated only if it contains the next variable code value in the sequence. If the third message is validated, the second device performs 418 the requested action associated with activation of the first device. If the second device is unable to validate the third message, the second device ends the process without performing the requested action and returns to awaiting 402 signals from the first device.

Figure 5A:
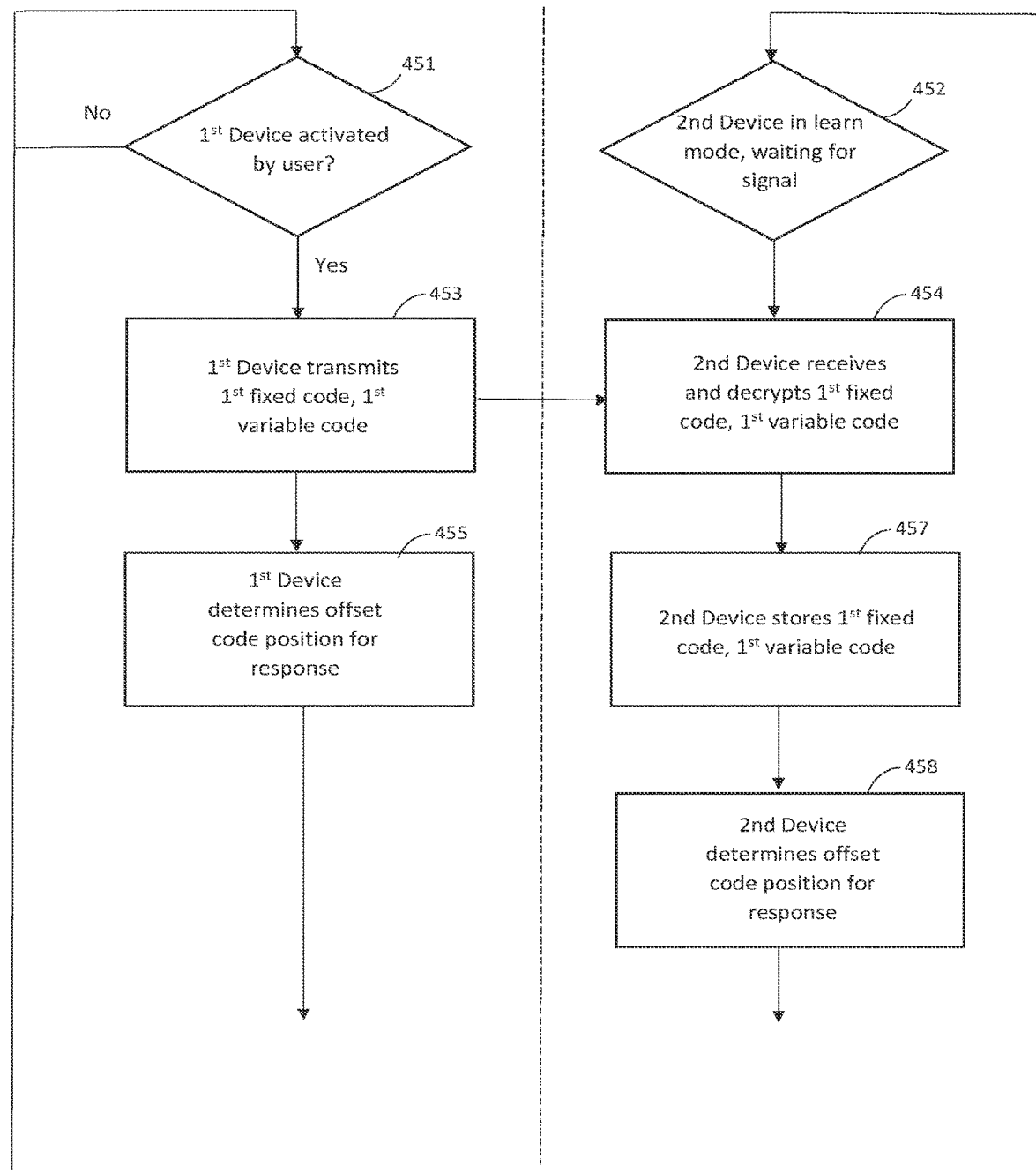
FIGS. 5A-C are flow diagrams showing an example communication flow between a first device and a second device during a learning or pairing sequence.
Figure 5B:
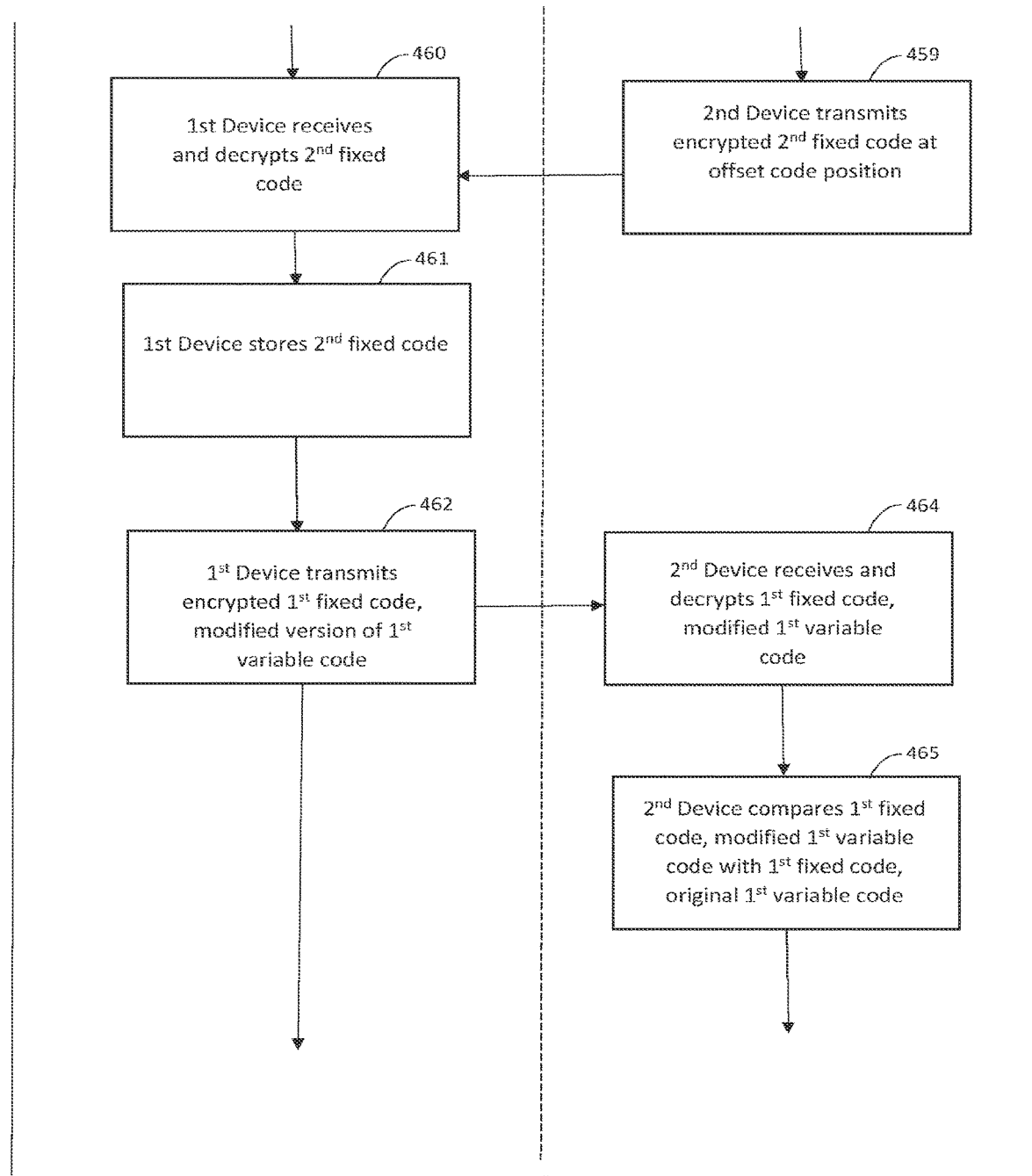
Figure 5C:
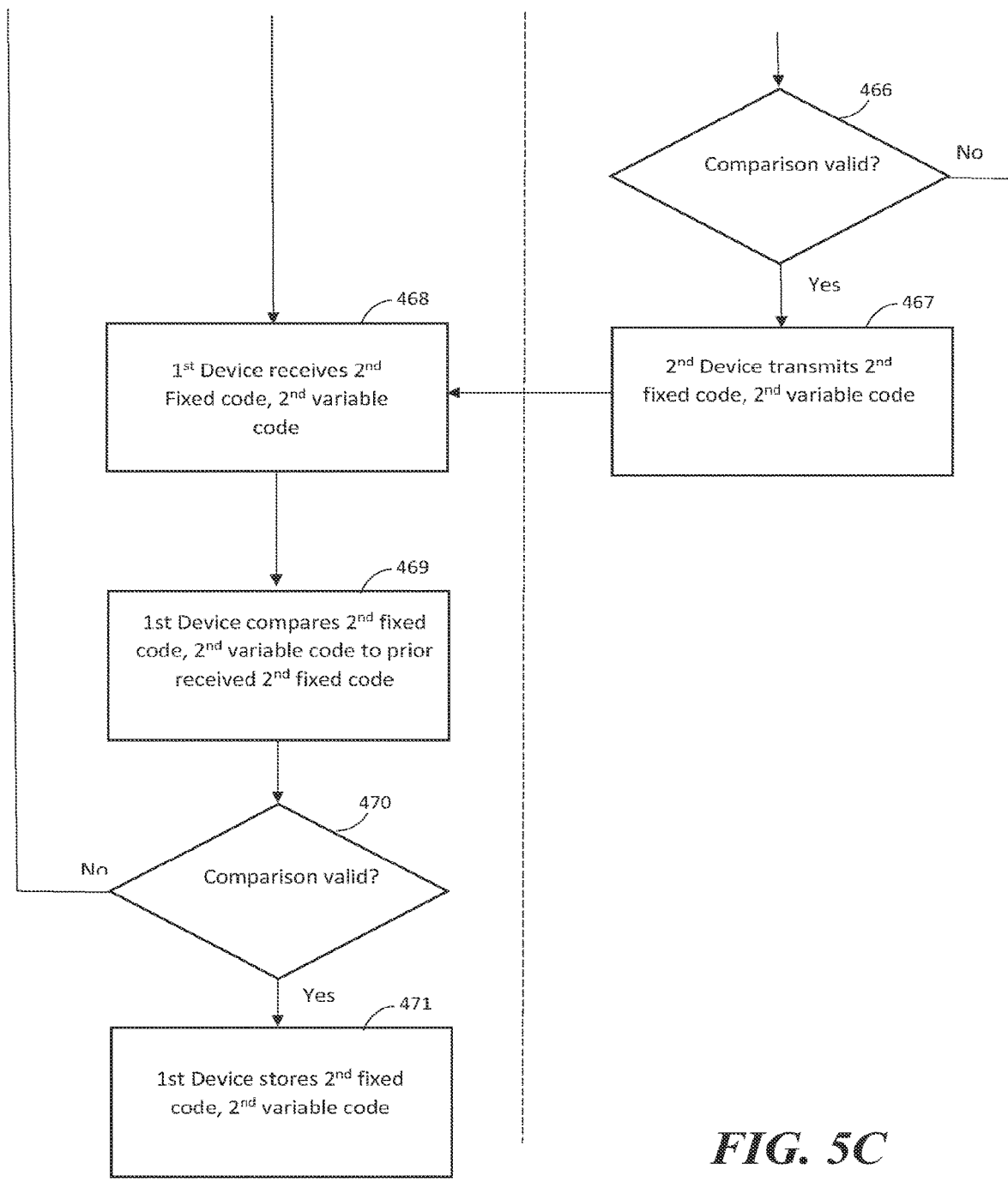

Turning now to FIGS. 5A-C, a flow diagram illustrates an example method of pairing a first device to a second device so that, for example, a user-actuated device and an operator device are synchronized in order to recognize and validate signals shared between the devices. The first device may be the transceiver 30 and the second device may be the operator 12 discussed previously. The method involves at least one of the devices learning a changing code sequence from the other device, and in some embodiments, may involve bi-directional learning so that each device receives and stores a series of fixed and changing code values from the other device. In some embodiments, the devices may be configured so that the method of pairing entails a button or other actuator being actuated on each device, such as pressing a button on a garage door operator to set the device in learn mode and then pressing a button on the remote control device to initiate the pairing process.

In one form, the pairing method begins when a first device is activated 451 by a user while a second device has been placed 452 in "learn" mode, such as by pressing a button or switching a lever on or associated with the second device. To begin, the first device contains within its memory a first fixed code and a first variable code, and the second device contains a second fixed code and a second variable code. When the first device is activated, it transmits 453 from the first device a first encrypted message that includes at least a first fixed code and a first changing or variable code, and specifies or determines 455, based on at least a portion of the first encrypted message, an offset code position for a subsequent message from the second device to include fixed code and changing/variable code information. The second device, meanwhile, receives 454 the first encrypted message while the second device is in the learn mode and stores 457 in the second device's memory the decrypted first fixed and first variable codes from the first encrypted message or portions thereof. The second device determines 458 an offset code position for a responsive message at which information of interest in a subsequent message will be positioned for the first device to retrieve. The second device then transmits 459 the response, comprising a second encrypted message including a second fixed code from the second device located at the determined offset position within the message. The second message is received and decrypted 460, and the first device stores 461 the second fixed code.

After receiving the response from the second device and storing associated values, the first device then transmits 462 a third encrypted message including at least the first fixed code and a changed version of the first variable code. The third message may include offset information based on information from the first or second message, and the offset of information in the third message may be the same or different as the offset of information in the second message.

When the second device receives 464 and decrypts the third encrypted message, the second device validates the message by comparing 465 the first fixed code and the changed versions of the first variable code to stored code values from the first encrypted message. If the second device determines 466 that the comparison is valid, the second device then transmits 467 in response to validating the third encrypted message a fourth encrypted message including the second fixed code and a second changing code from the memory of the second device. The second fixed code and second changing/variable code may be located at an offset position within the fourth message, and the offset position within the fourth message may be determined based on at least a portion of the first, second, and/or third message.

The first device receives 468 the fourth encrypted message, and identifies the position of the second fixed code and the second changing code if they have been offset. The first device validates the fourth message by comparing 469 the second fixed code and the second changing code to the response stored by the first device. If the fourth message is determined 470 to be valid, the first device stores 471 the second fixed code and the second changed version of the second variable code in response to validating the fourth encrypted message. However, if the first and second devices do not determine the same offset position for the second fixed code and second changing/variable code, then the first device will be unable to properly determine the second fixed code at this stage and will thus be unable to validate the fourth encrypted message.

The variable or changing codes transmitted by the first and second devices may be selected from those known in the art, such as rolling code systems in which the changing code is modified based on a preset algorithm and/or a predefined list or sequence of numbers. When a device validates a changing code by comparison with stored values, the device will ordinarily compare the received code value to a number expected subsequent values in order to account for activations of one device that are out of range of the other device or otherwise do not result in communication with the other device. For instance, in some embodiments a device will compare a received changing code to at least twelve stored values, and in some embodiments at least 24, 48, 96, 128, or 256 stored values.

A variety of methods and/or algorithms may be used to encrypt and/or decrypt the fixed and changing codes of each message transmitted between devices. In some forms, a first device transmits an encrypted signal by generating a radio frequency oscillatory signal, generating variable binary code, generating a three-valued/trinary code responsive to the variable binary code, and modulating the radio frequency oscillatory signal with the trinary code to produce a modulated trinary coded variable radio frequency signal for operation or control of a second device. To provide even further security, in some embodiments the fixed code and the rolling codes may be shuffled or interleaved so that alternating trinary bits are comprised of a fixed code bit and a rolling code bit to yield, for example, a total of 40 trinary bits. The 40 trinary bits may then be packaged in a first 20-trinary bit frame and a second 20-trinary bit frame. A single synchronization and/or identification pulse may proceed the first and second frames to indicate the start of the frame and whether it is the first frame or the second frame. Signals may be configured to comply with local laws and regulations; for instance, immediately following each of the frames, the first device may be placed into a quieting condition to maintain the average power of the transmitter over a typical 100 millisecond interval and within local regulations (e.g. within legal limits promulgated by the United States Federal Communications Commission). The first trinary frame and the second trinary frame may be used to modulate a radio frequency carrier, for instance via amplitude modulation, to produce an amplitude modulated encrypted signal. The amplitude modulated encrypted signal may then be transmitted and may be received by the second device.

In some embodiments, the second device receives the amplitude modulated encrypted signal and demodulates it to produce a pair of trinary bit encoded frames. The trinary bits in each of the frames may be converted substantially in real-time to 2-bit or half nibbles indicative of the values of the trinary bits which ultimately may be used to form two 16-bit fixed code words and two 16-bit variable code words. The two 16-bit fixed code words may be used as a pointer to identify the location of a previously stored variable code value within the operator. The two 16-bit rolling code words may be concatenated by taking the 16-bit words having the more significant bits, multiplying it by 310 and then adding the result to the second of the words to produce a 32-bit encrypted variable code. The 32-bit encrypted code may then be compared via a binary subtraction with the stored variable code. If the 32-bit code is within a window or fixed count, the microprocessor of the second device may produce an authorization signal which may then be responded to by other portions of the second device's circuit to cause the garage door to open or close as commanded. In the event that the code is greater than the stored rolling code, plus the fixed count, indicative of a relatively large number of incrementations, a user may be allowed to provide further signals or indicia to the receiver to establish authorization, instead of being locked out, without any significant degradation of the security. This process may be accomplished by the receiver entering an alternate mode using two or more successive valid codes to be received, rather than just one. If the two or more successive valid codes are received in this example, the operator will be actuated and the garage door will open. However, in such an embodiment, to prevent a person who has previously or recently recorded a recent valid code from being able to obtain access to the garage, a trailing window is compared to the received code. If the received code is within this trailing window, the response of the system simply is to take no further action, nor to provide authorization during that code cycle due to indications that the code has been purloined.

Figure 6:
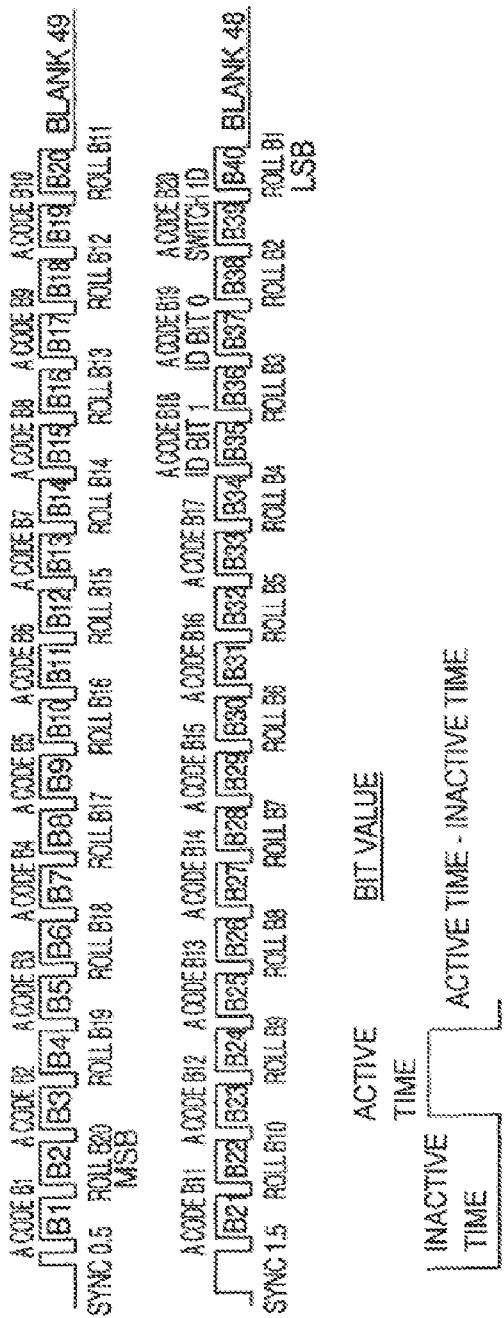
FIG. 6 is a timing diagram of examples of signals generated by a portion of a transmitter of one of the first and second devices.

FIGS. 6-8 demonstrate one potential encryption/decryption scheme. FIG. 6 is an example of trinary code which is actually used to modify the radio frequency oscillator signal. In the depicted example, the bit timing for a 0 is 1.5 milliseconds down time and 0.5 millisecond up time, for a 1, 1 millisecond down and 1 millisecond up, and for a 2, 0.5 millisecond down and 1.5 millisecond up. The up time is actually the active time when a carrier signal or wave is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

Figure 7A:
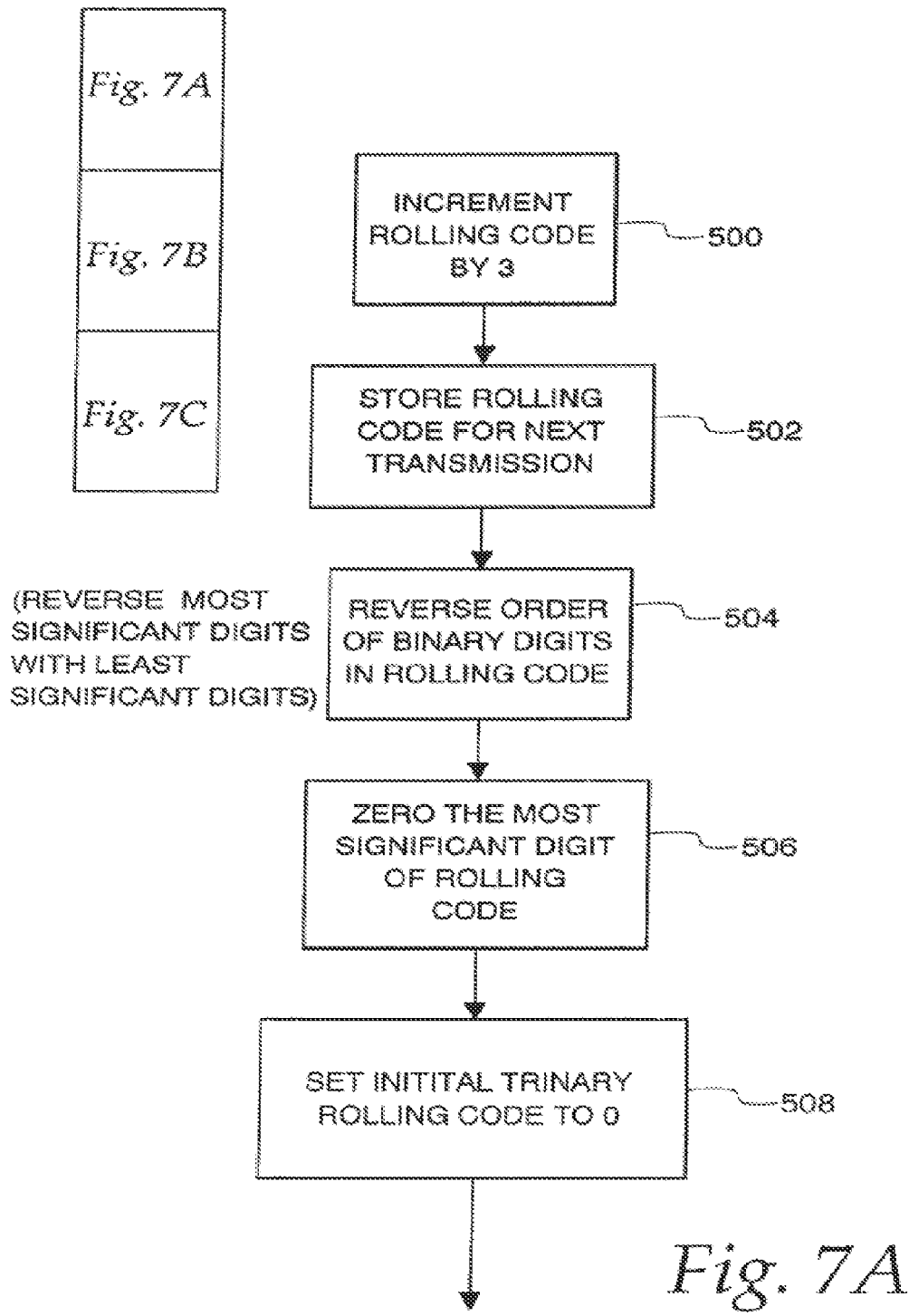
FIGS. 7A-C are flow diagrams showing examples of operation of the transmitter.
Figure 7B:
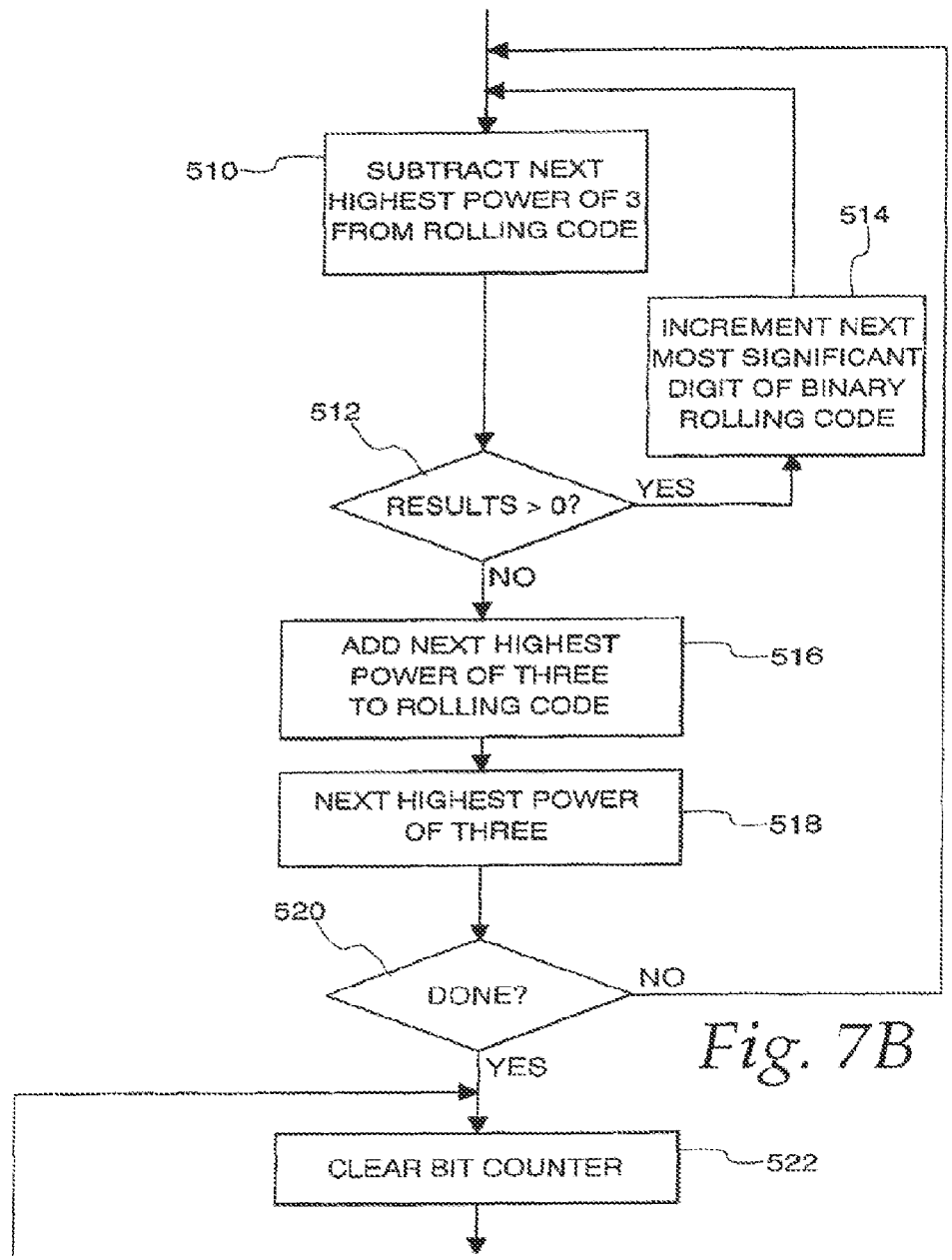
Figure 7C:
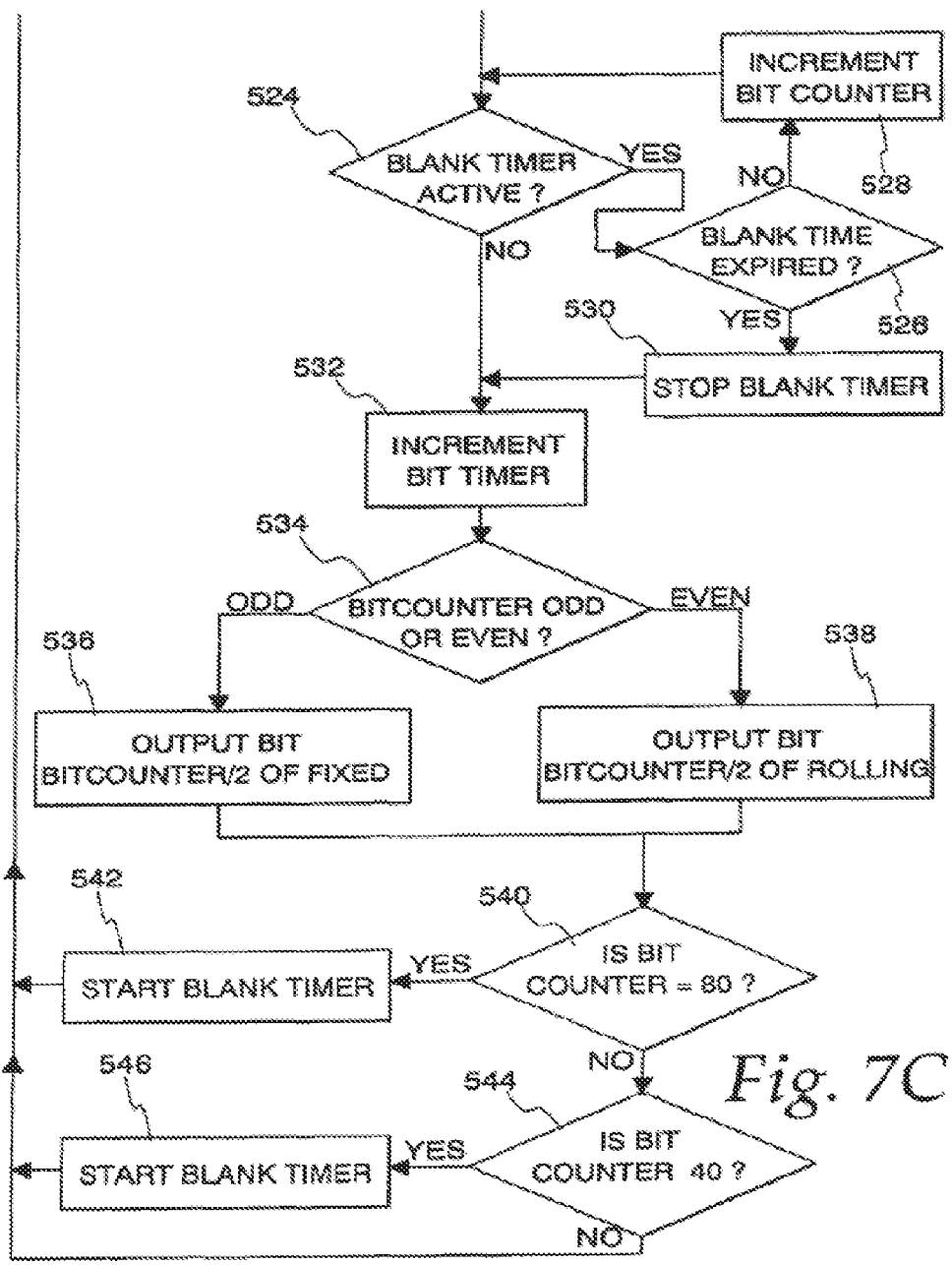

Referring now to FIGS. 7A through 7C, the flow chart set forth therein describes one form of generating a rolling code encrypted message from a first device to be transmitted to a second device. A rolling code is incremented by three in a step 500, followed by the rolling code being stored 502 for the next transmission from the device when a button is pushed. The order of the binary digits in the rolling code is reversed, inverted or mirrored in a step 504, following which in a step 506, the most significant digit is converted to zero effectively truncating the binary rolling code. The rolling code is then changed to a trinary code having values 0, 1 and 2 and the initial trinary rolling code bit is set to 0. In some forms, the trinary code is actually used to modify the radio frequency oscillator signal, and an example of trinary code is shown in FIG. 6. It may be noted that the bit timing in FIG. 6 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated or transmitted. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which the method returns to the step 510. If the result is not greater than 0, the next highest power of 3 is added to the rolling code in step 516. In step 518, another highest power of 3 is incremented and in a step 520, a test is determined as to whether the rolling code is completed. If not, control is transferred back to step 510. If the rolling code is complete, step 522 clears the bit counter. In a step 524, a blank timer is tested to determine whether it is active or not. If not, the bit counter is incremented in step 532. However, if the blank timer is active, a test is made in step 526 to determine whether the blank timer has expired. If the blank timer has not expired, control is transferred to a step 528 in which the bit counter is incremented, following which control is transferred back to the decision step 524. If the blank timer has expired as measured in decision step 526, the blank timer is stopped in a step 530 and the bit counter is incremented in a step 532. The bit counter is then tested for being odd or even in a step 534. If the bit counter is odd (i.e. not even), control is transferred to a step 536 where the output bit is the bit counter of the fixed code divided by 2. If the bit counter is even, the output bit is the bit counter of the rolling code divided by 2 in a step 538. The bit counter is tested to determine whether it is set to equal to 80 in a step 540—if yes, the blank timer is started in a step 542, but if not, the bit counter is tested for whether it is equal to 40 in a step 544. If it is, the blank timer is started in a step 546. If the bit counter is not equal to 40, control is transferred back to step 522.

Figure 8B:
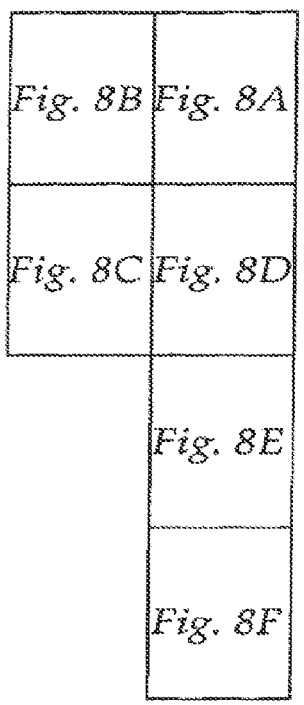
Figure 8B:
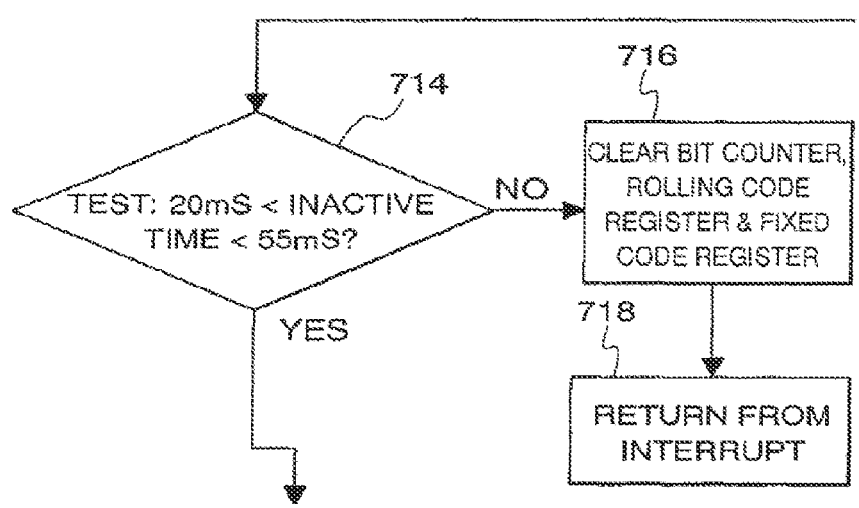
Figure 8C:
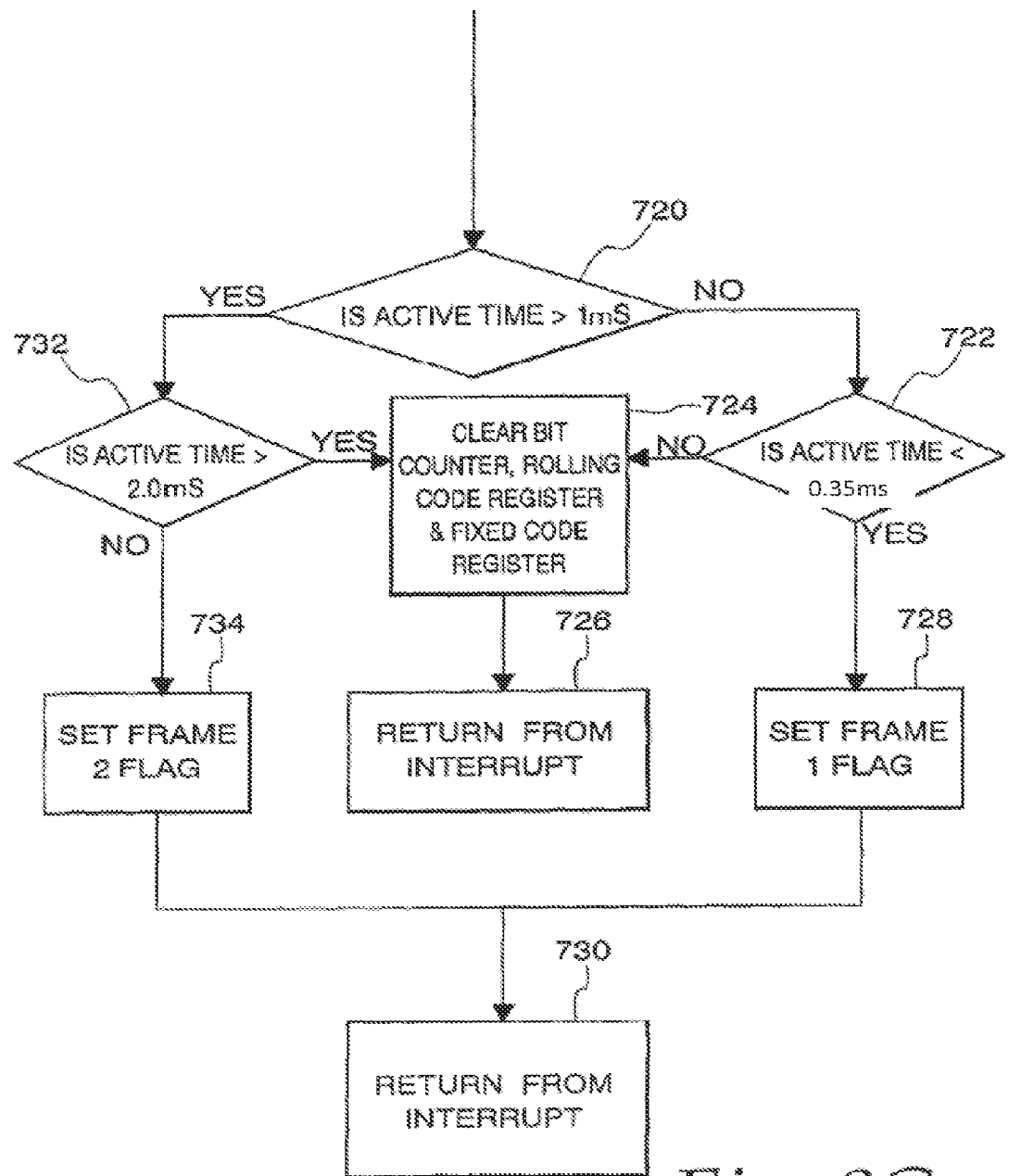

Referring now to FIGS. 8A through 8F and, in particular, to FIG. 8A, one example of processing of an encrypted message by a second device from a first device is set forth therein. In a step 700, an interrupt is detected and acted upon. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter is zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

In the event that the inactive time is between 20 milliseconds and 55 milliseconds, a test is made in a step 720 to determine whether the active time is greater than 1 millisecond, as shown in FIC. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register, and the return is exited in the step 726. If the active time is greater than 1 millisecond as tested in step 720, a test is made in a step 732 to determine whether the active time is greater than 2.0 milliseconds, and if not the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
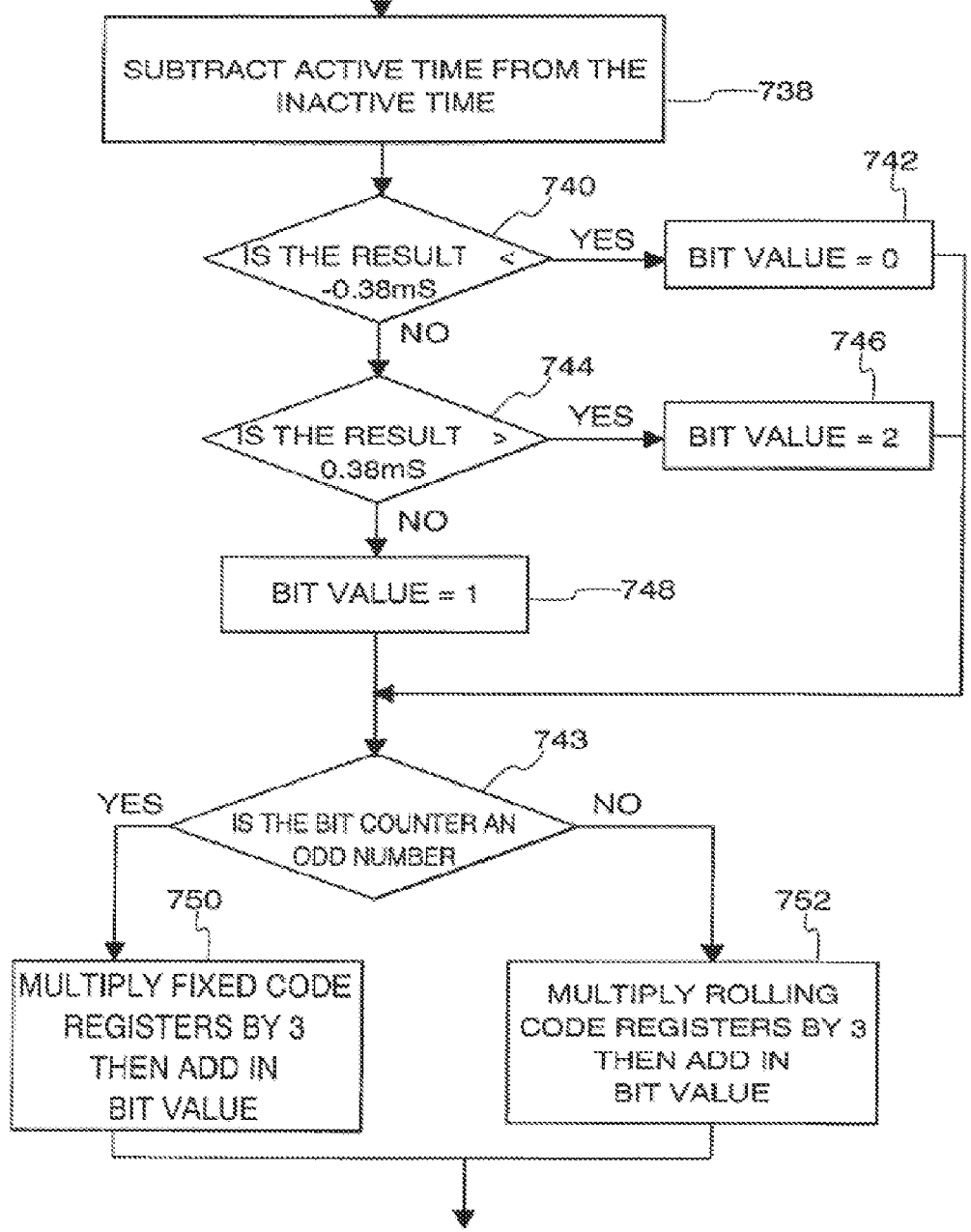

In the event that the bit counter test in step 712 indicates that the bit counter is not 0, control is transferred to setup 736, as shown in FIG. 8A. Both the active and inactive periods are tested to determine whether they are less than 4.5 milliseconds. If either period is not less than 4.5 milliseconds, the bit counter is cleared as well as the rolling code register and the fixed code registers. If both are equal to or greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8E:
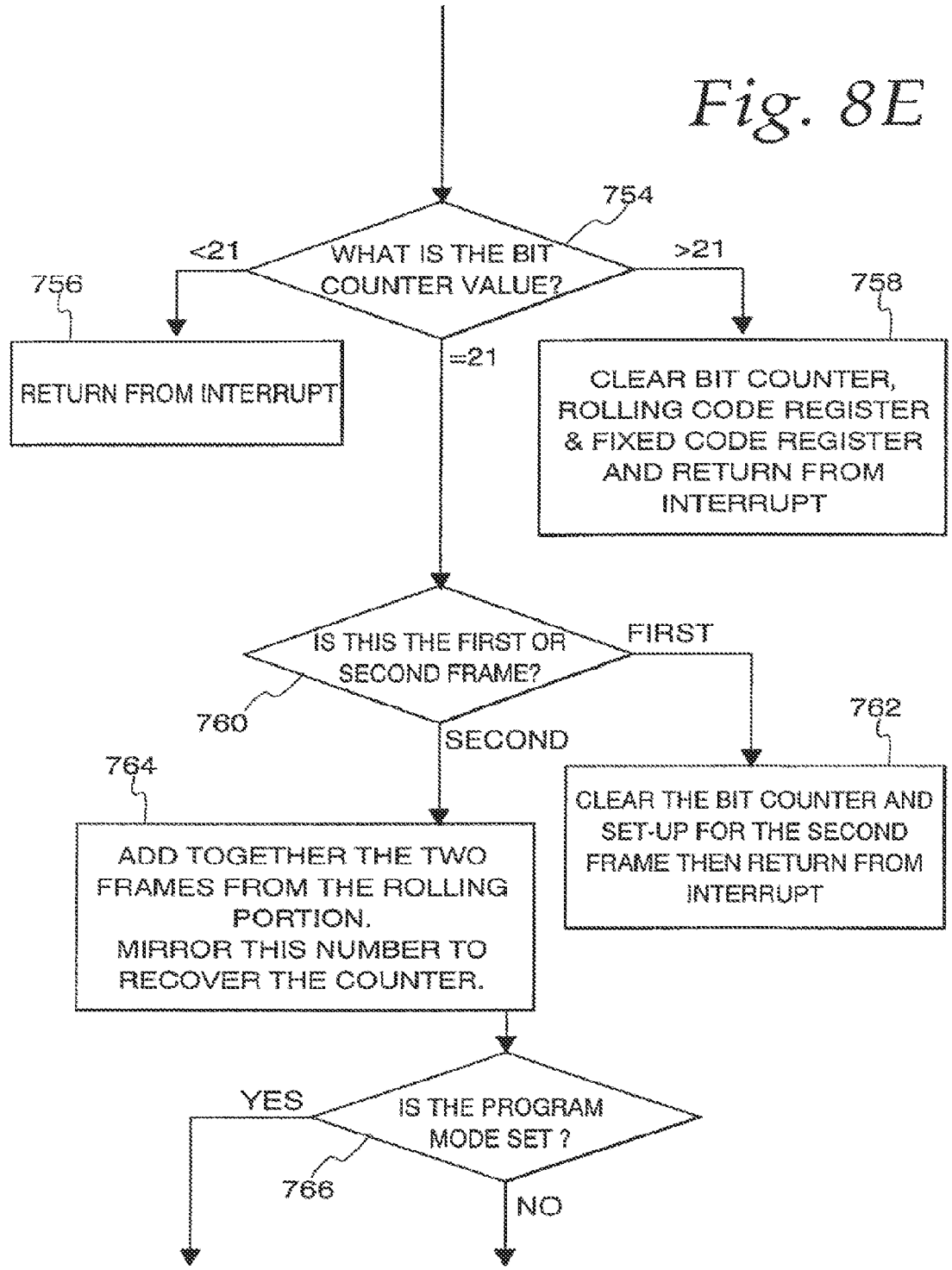
Figure 8F:
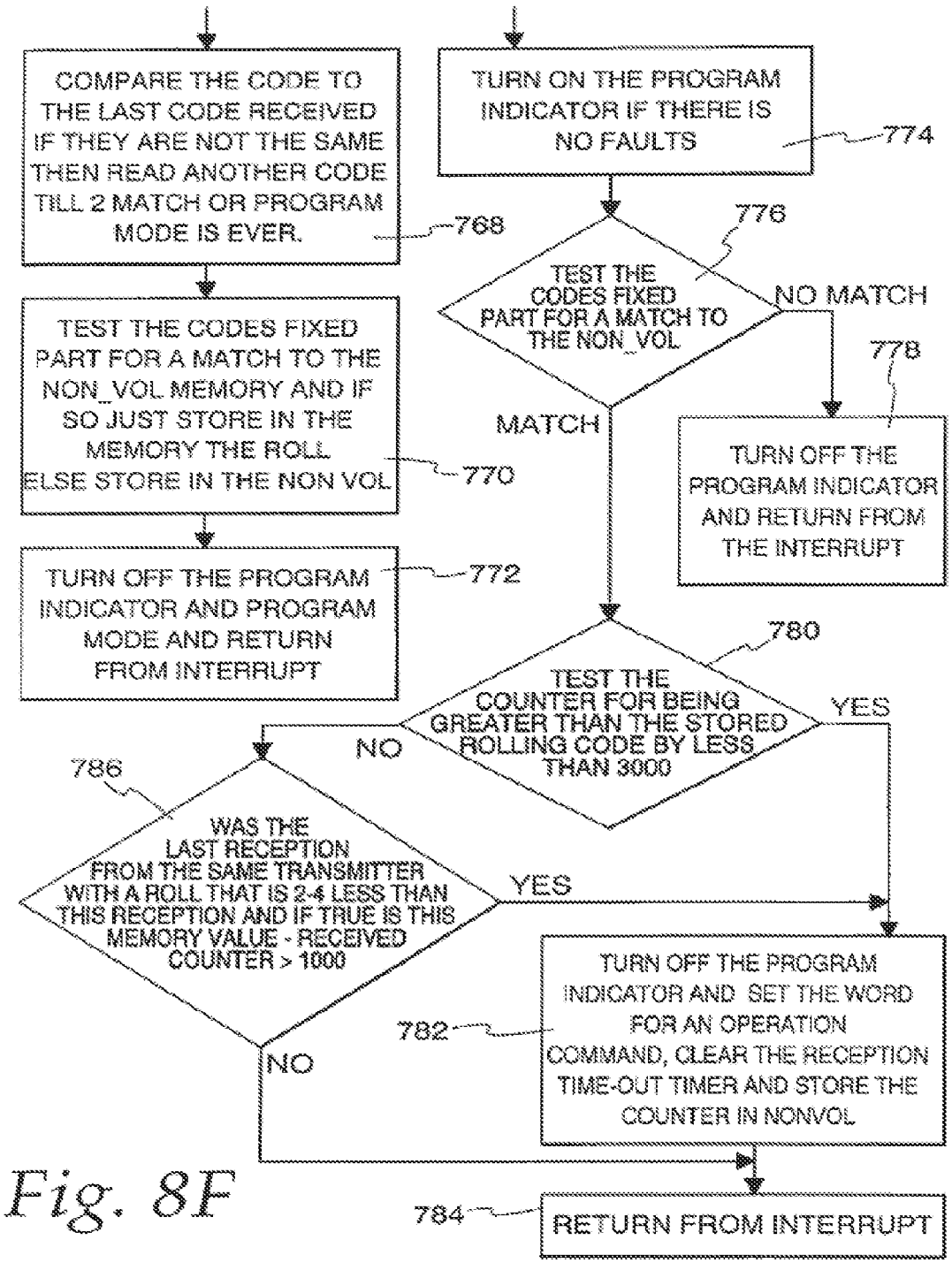

If the bit counter indicates that an odd number trinary bit is being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, then another code will be read until two successive codes match or the program mode is terminated. In a step 770, the codes are tested such that the fixed codes are tested for a match with a fixed code non-volatile memory. If there is a match, the rolling portion is stored in the memory. If there is not, the rolling portion is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the first device. If it is not, a test is made in the step 786 to determine whether the last transmission from the same first device is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

Figure 8G:
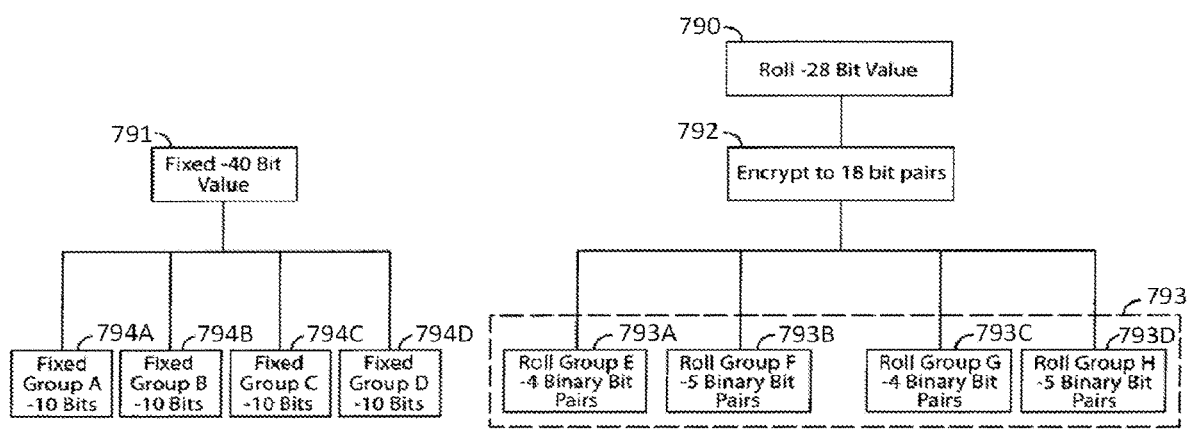
FIG. 8G is a schematic view of one example of bit processing for use in encrypting a message.

FIGS. 8G and 8H are schematic views of bit processing and parsing (FIG. 8G) and an example message diagram (FIG. 8H) configured in accordance with one example of forming an encrypted message. This provides one example in which a fixed code portion and variable (e.g. rolling) code portion may be used to form an encrypted message. Referring now to FIG. 8G, one illustrative embodiment of bit processing and parsing will be presented. In this example, the only substantive content to be associated and transmitted with a 28 bit rolling code 790 comprises a 40 bit value that represents fixed information 791. This fixed information 791 may serve, for example, to uniquely identify the transmitter that will ultimately transmit this information. In this embodiment, the bits comprising the rolling code 790 are encrypted 792 by mirroring the bits and then translating those mirrored bits into ternary values as suggested above to provide corresponding bit pairs (in this example, this would comprise 18 such bit pairs) to thereby provide a resultant encrypted rolling code 793. This mirroring can be applied to specific groupings of bits in the rolling code creating mirrored groups or can involve the entire value. In this illustrative example, the encrypted rolling code 793 is presented for further processing as four groups. In this example, these four groups comprise a roll group E 793A comprised of four binary bit pairs, a roll group F 793B comprised of five binary bit pairs, a roll group G 793C comprised of four binary bit pairs, and a roll group H 793D comprised of five binary bit pairs.

The 40 bit fixed information 791 is subdivided in a similar manner albeit, in this embodiment, sans encryption. This comprises, in this particular illustrative approach, forming four subgroups comprising a fixed group A 794A, a fixed group B 794B, a fixed group C 794C, and a fixed group D 794D, wherein each such group is comprised of 10 bits of the original 40 bit value.

These variously partitioned data groups can then be used as shown in FIG. 8H to effect a desired transmission. In this example, one or more joint messages 795 provide a primary vehicle by which to communicate the desired information (which includes both the encrypted rolling code and fixed information data as modified as a function of a given portion of the encrypted rolling code along with a recovery identifier that represents that given portion of the encrypted rolling code). This joint message 795 comprises, generally speaking, a first 20 bit portion 796 and a second 30 bit portion 797.

The first portion 796 comprises, in this embodiment, the following fields: "0000"—these bits 796A serve to precharge the decoding process and effectively establish an operational threshold; "1111"—these bits 796B comprise two bit pairs that present the illegal state "11" ("illegal" because this corresponds to a fourth unassigned state in the ternary context of these communications) and serve here as a basis for facilitating synchronization with a receiving platform; "00"—this bit pair 796C identifies a type of payload being borne by the joint message (in this embodiment, "00" corresponds to no payload other than the fixed identifying information for the transmitter itself, "01" corresponds to a supplemental data payload, and "10" corresponds to a supplemental data-only payload—further explanation regarding these payload types appears further below); "Xx"—this bit pair 796D presents a frame identifier that can be used by a receiver to determine whether all required joint messages 795 have been received and which can also be used to facilitate proper reconstruction of the transmitted data; "B3, B2, B1, B0"—these two bit pairs 796E comprise an inversion pattern recovery identifier and are selected from the bits that comprise the encrypted rolling code 793 described above; "B7, B6, B5, B4"—these two bit pairs 796F comprise a bit order pattern recovery identifier and are also selected from the bits that comprise the encrypted rolling code 793 described above.

There are various ways by which these recover identifier values can be selected. By one approach, a specified number of bits from the encrypted roll group can be selected to form a corresponding roll sub-group. These might comprise, for example, the first or the last eight bits of the encrypted roll group (in a forward or reversed order). These might also comprise, for example, any eight consecutive bits beginning with any pre-selected bit position. Other possibilities also exist. For example, only even position bits or odd position bits could serve in this regard. It would also be possible, for example, to use preselected bits as comprise one or more of the previously described roll group sub-groups.

It would also be possible to vary the selection mechanism from, for example, joint message to joint message. By one simple approach in this regard, for example, the first eight bits of the encrypted roll group 793 could be used to form the roll sub-group with the last eight bits of the encrypted roll group 793 being used in a similar fashion in an alternating manner. The bits that comprise this roll sub-group may then be further parsed to form two recovery indicators. These recovery indicators may be used in conjunction with one or more lookup tables to determine a data bit order pattern to use with respect to formatting the data as comprises the a portion of the joint message. In some embodiments, roll groups used to form the recovery indicators do not appear in the joint message.

Figure 9A:
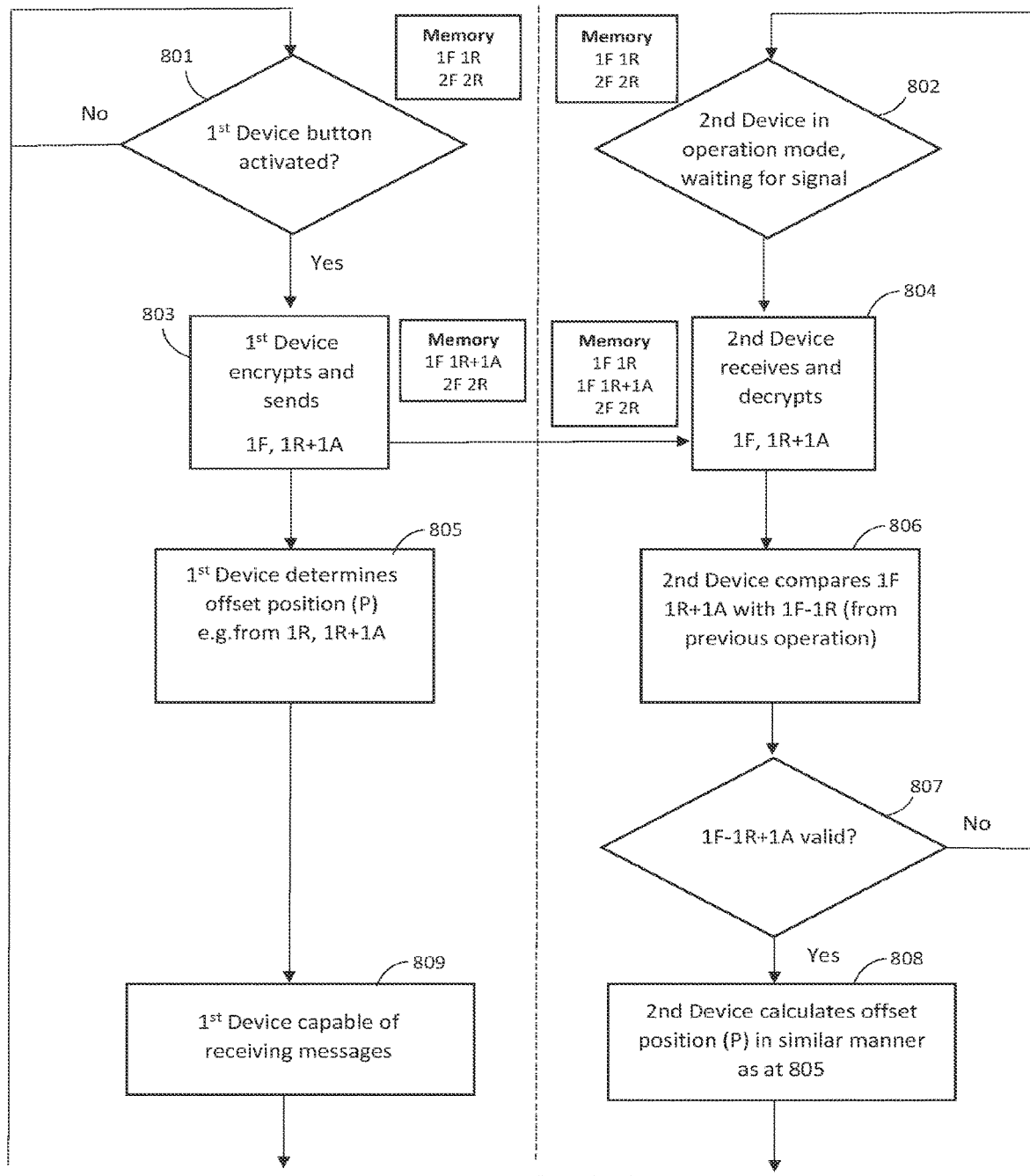
FIGS. 9A-C are flow diagrams showing another example communication flow between a first device and a second device during normal operation.
Figure 9B:
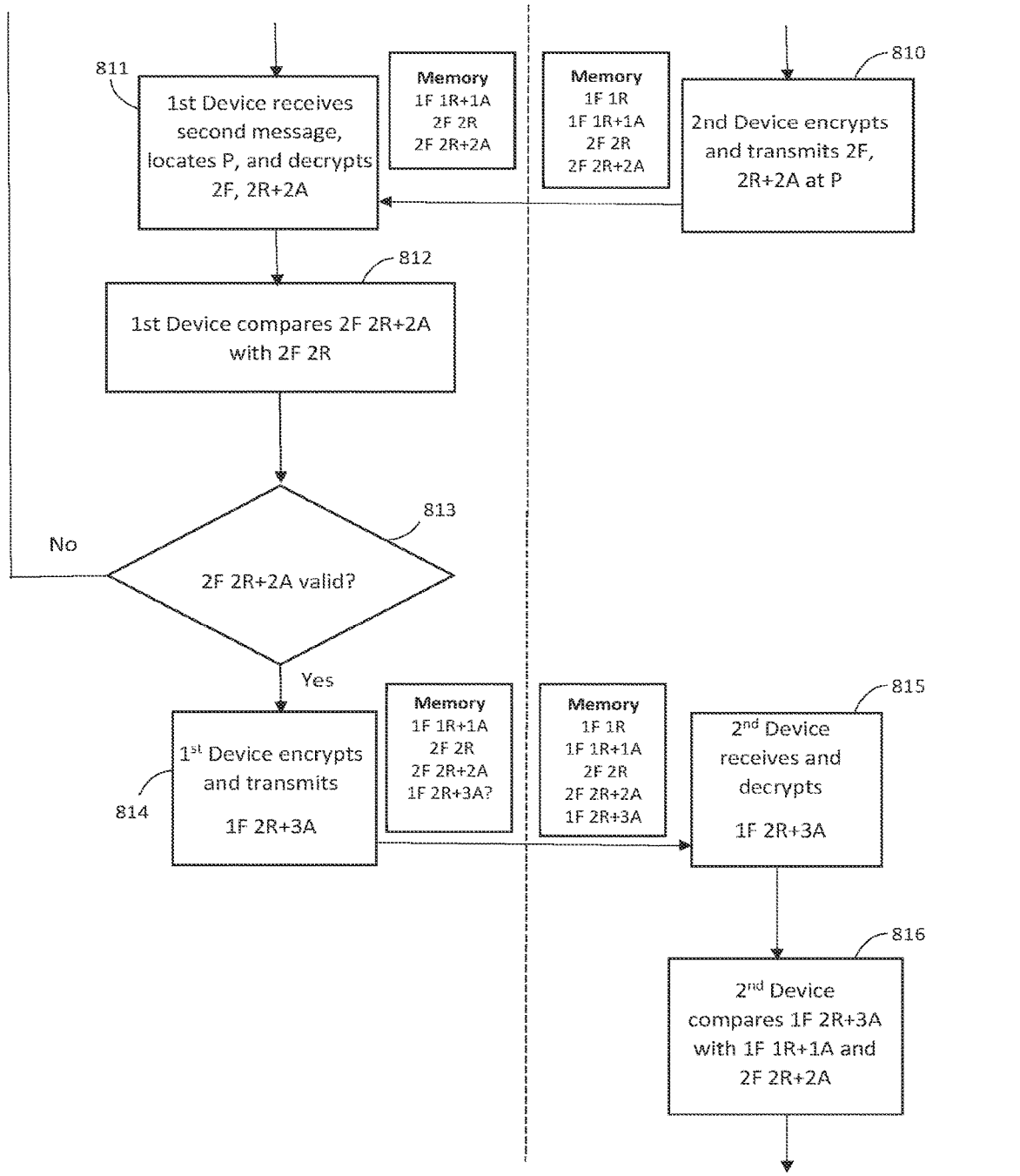
Figure 9C:
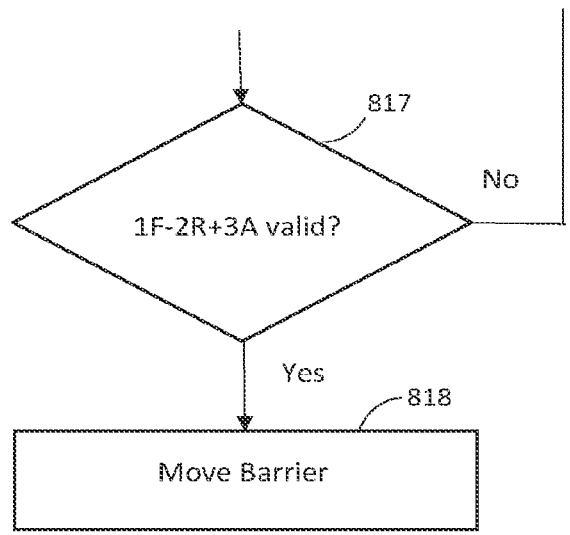

FIGS. 9A, 9B, and 9C are interconnected flow charts that demonstrate a more specific example of the process discussed above with respect to FIGS. 4A-C. In this example, a first device (such as a handheld or vehicle mounted transceiver) commands a second device (such as a garage door operator) to take an action through encrypted transmissions of rolling codes. Throughout FIGS. 9A-C, "1F" refers to a first fixed code, "1R" refers to a first rolling code, "2F" refers to a second fixed code unrelated to 1F, and "2R" refers to a second changing/rolling code unrelated to 1R. "1A," "2A," and "3A" each refer to an "adder" that represents a value added to the rolling code or one or more rolls of the rolling code. 1A, 2A, and 3A may be the same or different. The communications involve multiple levels of encryption so that each device encrypts fixed and changing codes with a first level of encryption and then encrypts the entire transmitted message with a second level of encryption, thus entailing the other device to decrypt the message, locate the encrypted fixed and changing codes within the decrypted message, and then decrypt the fixed and changing codes.

Initially, the first and second devices both have stored in their memories a first fixed code and first variable code from the immediately previous operation involving the first device, as well as a second fixed code and second rolling code from the immediately previous operation involving the second device. When the first device is activated by a user in a manner intended to cause an action by the second device, such as by pressing an activation button (step 801), the first device creates or otherwise assembles a first message that includes a first fixed code corresponding to the first device (1F) and a first changed version of the first rolling code (1R+1A) representing the rolling code value from the previous operation as modified by a first change protocol (i.e. an algorithm that cycles through a specified number of codes in a sequence or calculates a new value from the initial rolling code value). The changed code (1F 1R+1A) is stored in the memory of the first device, and is also encrypted using one or more encryption methods for transmittal to the second device (step 803). At this point, the initial value of the rolling code (1R) may be optionally deleted from the device memory. The first device also specifies or determines 805 an offset position at which it expects to find an encrypted fixed and/or rolling code in a subsequently-received message. The offset position (P) may be determined from one or both of the rolling code values (1R and/or 1R+1A) or a portion thereof, or from the encrypted message or a portion thereof. For instance, the 1R+1A may include bit position data within a specific portion of its sequence or the first device may use a lookup table, apply an algorithm to 1R+1A or one or more portions thereof in order to calculate or otherwise determine or specify the offset position P. For instance, the transmission characteristics of recovery identifiers (e.g. portions 796E and/or 796F of the message 795 shown in FIG. 8H), a portion of the encrypted changing code portion (e.g. part of the 30 bit portion 797 shown in FIG. 8H), and/or a portion of the decrypted changing code value may determine or specify: a) how to position (e.g. shift or offset) the data of interest within a message that is to be assembled and communicated; and b) how a recipient of the message may focus on the data of interest that has been shifted, for example determining a number of bits to ignore before beginning reading of a fixed or changing code at a point designated as P.

The second device, which is in operation mode and awaiting signals (step 802), receives the first encrypted message from the first device, decrypts the message to obtain the encrypted first fixed code and first variable code (1F 1R+1A), decrypts the first fixed code and first variable code, and stores the new value in its memory (step 804). The second device then compares the first fixed code and first variable code received from the first device (1F 1R+1A) to expected values based on stored code values (e.g. by applying the same algorithm used by the first device to previous first device values stored in the second device's memory (1F 1R)) (step 806). When comparing the received values with stored values, the second device will perform a validation step 807. If the fixed codes match and the received first rolling code (1R+1A) matches an expected value based on the stored rolling code (1R), the second device will establish or maintain a previously-established communications session (e.g. constituted by multiple messages between the first and second devices) and will proceed to further communicate with the first device. In order to account for accidental triggering of the first and/or second devices, use of multiple first devices with the second device, or other situations in which the rolling code received from the first device may not exactly match the expected value, this validation step preferably compares the received rolling code (1R+1A) to a set number of values from a series of values that fall within a sequence before and/or after the expected value (i.e. within a window of specified size around the expected value), and consider the message from the first device valid if the received rolling code matches any value within the series. In this way, activation of one device when not in range of the other will not completely desynchronize the two devices and render communication impossible. If the decrypted code values do not match the stored code values, the second device ignores the first message and returns to step 802.

If the received message is validated, the second device calculates 808 an offset position (P) at which to include encrypted fixed and variable codes. As depicted in FIG. 9A, the second device may calculate the same offset position (P) in the same manner calculated by the first device at step 805.

In response to validating the first encrypted message, and after determining the offset position, the second device transmits 810 a response comprising a second encrypted message derived from a second fixed code (2F) corresponding to the second device and a second rolling code (2R+2A) that is independent from the first changing code and represents a modified version of the second changing code from the immediately previous operation (2R). The second fixed code (2F) and second rolling code (2R+2A) are encrypted and positioned at the determined offset position (P) within the encrypted second message. These values for (2F) and (2R+2A) also are stored in the second device's memory, so that at this stage the second device memory contains the first fixed and variable code from the previous operation (1F 1R), the second fixed and variable code from the previous operation (2F 2R), the first fixed and variable code from the first encrypted message sent by the first device (1F 1R+1A), and the second fixed and variable code from the encrypted response (2F 2R+2A).

The first device is capable of receiving (step 809) messages from the second device, which may require actively enabling the receiver if the first device is configured to conserve power and has its receiver in an off configuration by default. When the second device's response is received by the first device, the first device will decrypt the second message, locate the offset position (P), and decrypt the encrypted fixed and variable codes to determine the second fixed code and second rolling code (2F, 2R+2A) (step 811). These values (2F, 2R+2A) are stored in the first device's memory, along with the second fixed and variable code from the previous operation (2F 2R) and the first fixed and variable code from the first encrypted message (1F 1R+1A).

The first device then compares the second fixed code and second rolling code (2F 2R+2A) with fixed and variable codes from a previous operation (2F 2R) stored in the memory of the first device (step 812). The first device will then perform a validation step (step 813) similar to the validation step performed by the second device at step 807. If the second fixed code matches the fixed code from the prior operation and the second variable code (2R+2A) matches the prior changing code as modified according to a set of established rules for the changing code, taking into account a predetermined accepted amount of error (e.g. forward-looking window), the response message is considered validated. If the second fixed and variable codes (2F 2R+2A) are determined valid (step 813), the first device generates or otherwise assembles a message including at least the first fixed code and a changed version of the second rolling code (1F 2R+3A) by applying an algorithm (which may be the same or different as the algorithm used at step 803 and/or step 810) to the rolling code value received from the second device (2R+2A), encrypts the message to create a third encrypted message, stores the new values in its memory, and transmits the third encrypted message to the second device (step 814). Generation or assembly of the third encrypted message may include configuring the data of interest (i.e. the first fixed code and the changed version of the second rolling code (1F 2R+3A)) at an offset position within the message at which the recipient second device will focus upon when parsing the message contents for extraction of the message contents. If the first device is unable to validate the response from the second device, the process ends and the first device returns to awaiting subsequent activation (801).

The second device receives and decrypts 815 the third encrypted message to determine the first fixed code and the changed version of the second variable code (1F 2R+3A), locating an offset position to do so if the third message includes offset information. The second device then compares the fixed codes from the first and third encrypted transmissions to confirm that they were transmitted by the same first device, and the rolling code from the third encrypted message to an expected value based on the last stored second rolling code value (2R+2A from the second encrypted message) (step 816). In a validation step similar to those discussed above, the second device then determines 817 if the third encrypted message is valid. If the third message is validated, the second device performs 818 the requested action associated with activation of the first device. If the second device is unable to validate the third message, it ends the process without performing the requested action and returns to step 802 awaiting signals from the first device.

Figure 10A:
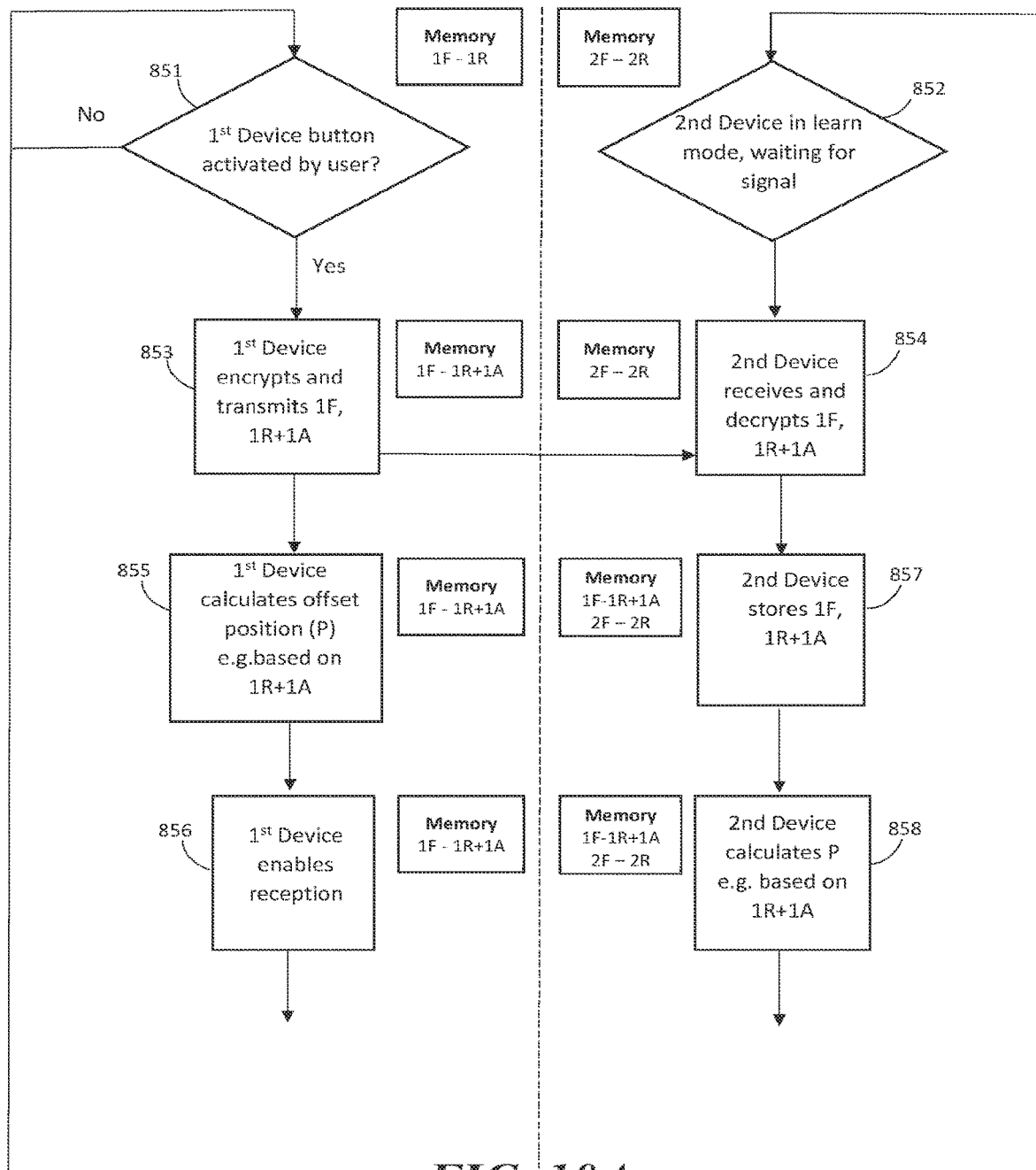
FIGS. 10A-C are flow diagrams showing another example communication flow between a first device and a second device during a learning or pairing sequence.
Figure 10B:
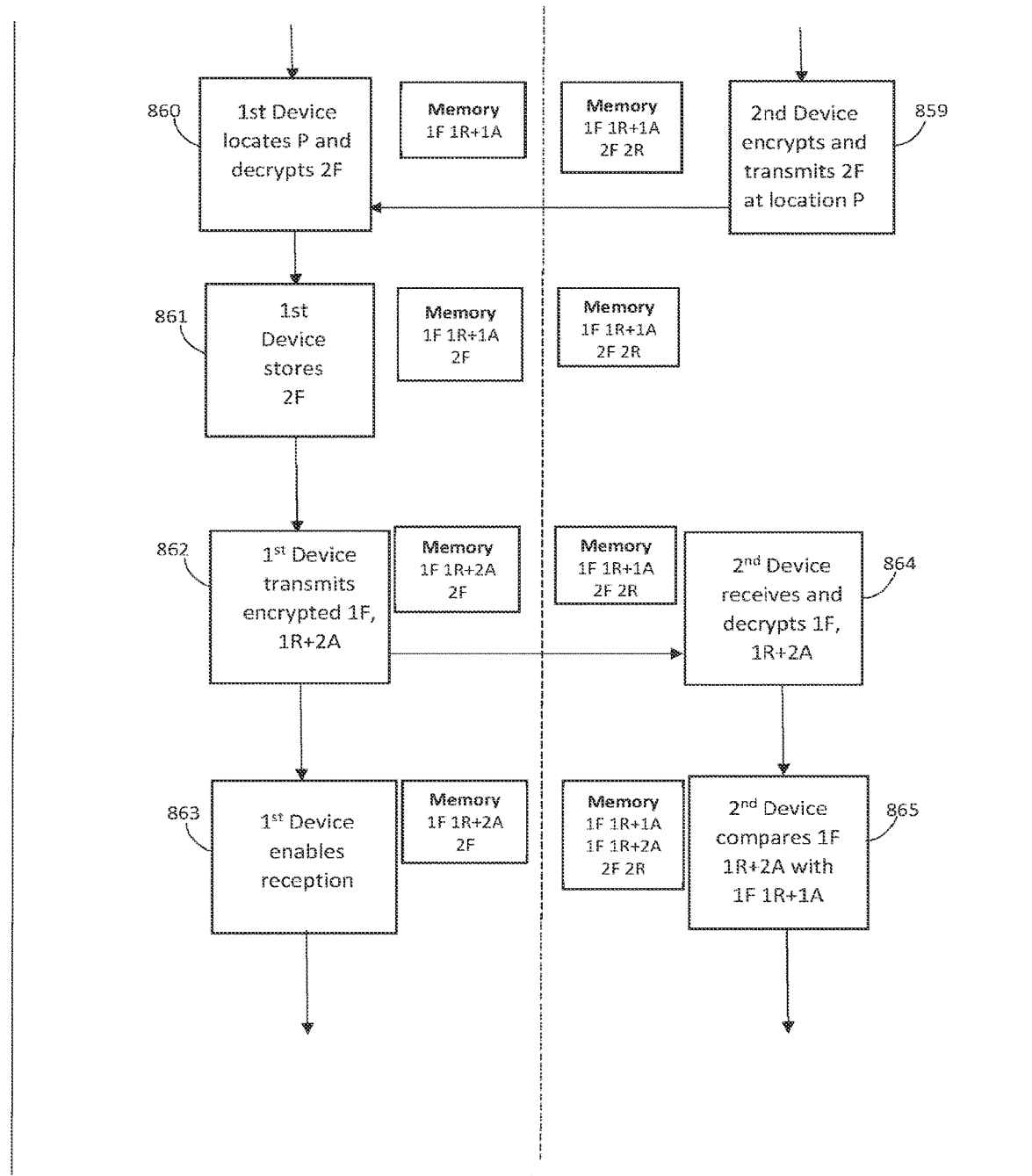
Figure 10C:
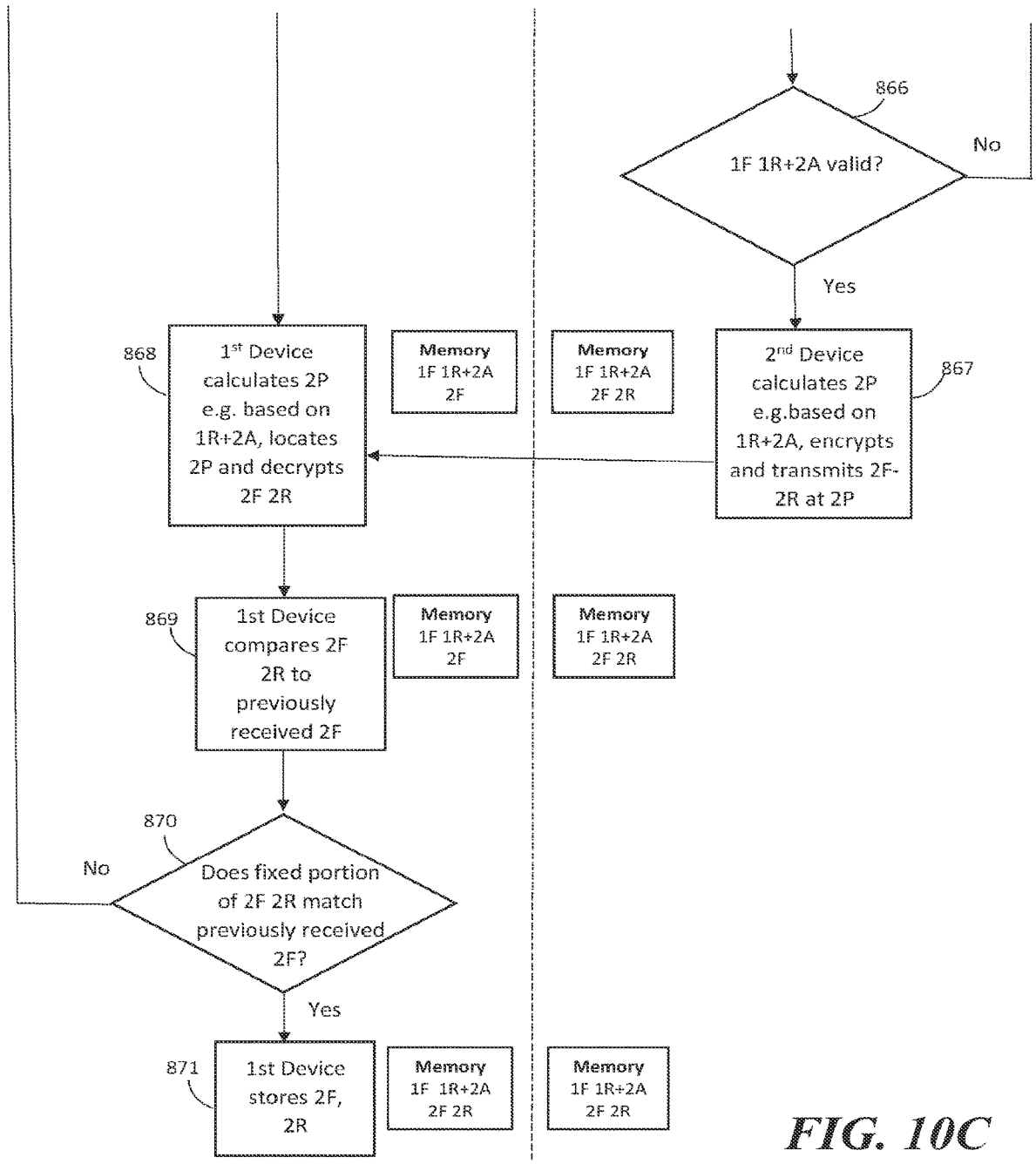

FIGS. 10A-C illustrate one example of a specific method of pairing a first device to a second device corresponding to the more general method illustrated in FIGS. 5A-C. In this example, a first device (e.g. a user-actuated device) and a second device (e.g. an operator device for carrying out a specific action) are synchronized in order to recognize and validate signals shared between the devices on both ends. Throughout FIGS. 10A-C, "1F" refers to a first fixed code, "1 R" refers to a first rolling code, "2F" refers to a second fixed code unrelated to 1F, "2 R" refers to a second rolling code unrelated to 1R. "1A," "2A," and "3A" each refer to an "adder" that represents a value added to the rolling code or one or more rolls of the rolling code. 1A, 2A, 3A may be the same or different. Each of these values are not necessarily the same as those in FIGS. 9A-C.

The pairing process begins when the first device is activated (such as by a user pressing a button on the device) (step 851) while a second device has been placed in "learn" mode (step 852) (e.g. by pressing a button or switching a lever associated with the second device). To begin, the first device contains within its memory a first fixed (1F) and first variable code (in this case rolling code 1R) that represent initial values or values from previous operation of the first device, and the second device contains a second fixed code (2F) and second variable code (in this case rolling code 2R) that represent initial values or values from previous operation. The fixed codes are each associated with and identify their respective devices, while the rolling codes are independent from one another. When the first device is activated, it generates a first encrypted message from the first fixed code and a modified version of the first rolling code (1F 1R+1A) (step 853), and determines or specifies based on at least a portion of the first rolling code or the first encrypted message an offset position (P) in which to expect an encrypted fixed and/or rolling code from the second device (step 855). The offset position (P) may be defined by values within the first rolling code or first encrypted message, or may be calculated therefrom based on a lookup table or an algorithm. If necessary, a first device receiver is enabled in order to receive the response from the second device (step 856).

Meanwhile, the second device receives the first encrypted message while the second device is in the learn mode (step 854) and stores in the second device's memory the decrypted first fixed and first variable codes (1F 1R+1A) from the first encrypted message (step 857) or portions thereof. The second device determines the offset position (P), based on the first encrypted message and/or first rolling code, at which to include its fixed code in a response (step 858). The second device then transmits a response comprising an encrypted version of the second fixed code (2F) located at shifted/offset position P (step 859). Optionally a second rolling code that is independent from the first rolling code may be included in the second encrypted message. The second rolling code may, for instance, begin with a minimum value (such as 00). If the second encrypted message is received by the first device, the second message is decrypted (step 860) and the first device focuses on or otherwise locates the data of interest and proceeds to parse and extract the data of interest from the offset position, thereafter storing the second fixed code (and optional second variable code if sent) (step 861). If either the first device or second device incorrectly calculates the offset position (P) of the second fixed code, the devices will not have matching second fixed codes (2F) due to the first device failing to begin parsing, extracting or otherwise reading 2F at the appropriate point.

After receiving the response from the second device and storing associated values, and either being set to learn mode by activation of a switch or receipt of a learning indicator from the second device, the first device then transmits a third encrypted message including at least the first fixed code (1F) and a changed version of the first changing code (1R+2A) (step 862). The first fixed code (1F) and a changed version of the first changing code (1R+2A) may be offset in a manner similar to that described above. If necessary, the first device also enables a receiver of the first device in anticipation of receiving further communications from the second device.

When the second device receives and decrypts the third encrypted message (step 864), it validates the message by comparing (step 865) the first fixed code and the changed versions of the first changing code (1F 1R+2A) to expected values from stored code values from the first encrypted message (1F 1R+1A) (step 866). If the first fixed code and the changed versions of the first changing code (1F 1R+2A) within the third message are offset/shifted, the second device also must determine the offset position and subsequently focus thereon for parsing and/or extraction of the relevant data. If the second device determines that the codes from the third encrypted message (1F 1R+2A) are valid (step 866), the second device then transmits, in response to validating the third encrypted message, a fourth encrypted message including encrypted versions of the second fixed code and a second changing code (2F 2R) (step 867). The second device positions encrypted versions of the second fixed code and the second changing code (2F 2R) at a second offset position (2P) in the fourth message based on the current version of the first changing code (1R+2A). Due to the second offset position (2P) being based on a version of the first changing code that differs from the version of the first changing code that is included in the first message, the second offset position (2P) likely differs from the first offset position (P).

The first device receives and decrypts the fourth encrypted message (step 868), calculates the second position (2P) of the fourth message at which the second device's encrypted codes are located based on the changing code (1R+2A) from the third message, decrypts the second fixed code and second changing code (2F 2R) at the second position (2P), and validates the fourth message by comparing the fixed code of the fourth message to the previously-received fixed code (step 869). If the fixed codes are the same, indicating that both came from the second device and that both the first and second devices were capable of calculating positions P and 2P for the two transmissions of the second fixed code, the fourth message is determined to be valid (step 870), the first device stores the second fixed code and the second rolling code (2F 2R) (step 871). The first and second devices now have stored in their respective memories matching first fixed/rolling and second fixed/rolling code pairs (1F 1R+2A and 2F 2R) that may be used as initial values (1F 1R and 2F 2R) in an operation such as that shown in FIGS. 9A-9C.

Learn mode may operate on the same frequency as operation mode, and both modes may operate on multiple frequencies. In some embodiments the first device and the second device communicate wirelessly in the operation mode and/or the learn mode via one or more frequencies, channels, bands, and radio physical layers or protocols including but not limited to, for example, 300 MHz-400 MHz, 900 MHz, 2.4 GHz, Wi-Fi/WiLAN, Bluetooth, Bluetooth Low Energy (BLE), 3GPP GSM, UMTS, LTE, LTE-A, 5G NR, proprietary radio, and others. In other embodiments, the first device and the second device communicate in the operation mode and/or the learn mode via a wired connection and various protocols including but not limited to two (or more) wire serial communication, Universal Serial Bus (USB), Inter-integrated Circuit (I²C) protocol, Ethernet, control area network (CAN) vehicle bus, proprietary protocol, and others. In some embodiments, the maximum distance between the first device and second device may vary between learn mode and operation mode, while in other modes the maximum range will be the same in both modes due to variation in range from interference.

Figure 11:
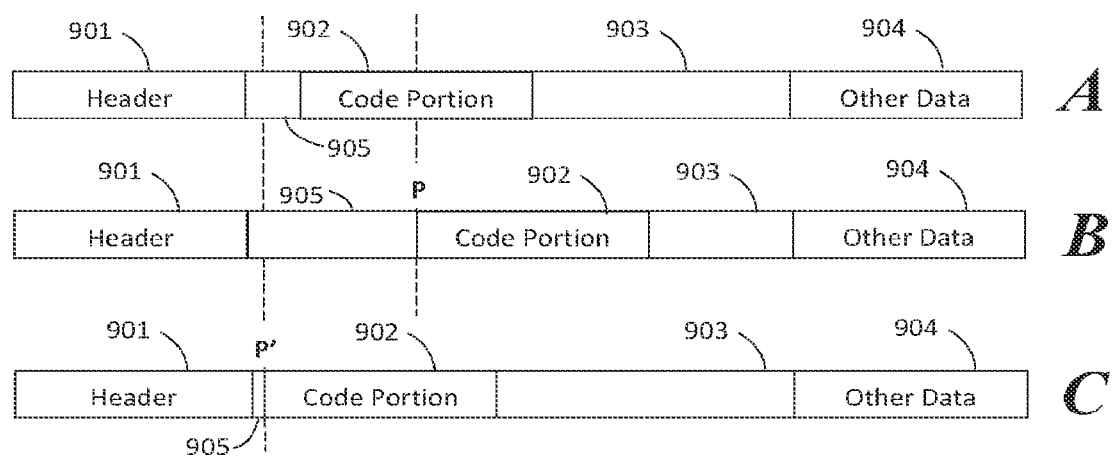
FIG. 11 shows diagrams of example message segments demonstrating positioning of codes within a message based on information from a previous message, wherein the message is of a fixed length.
Figure 12:
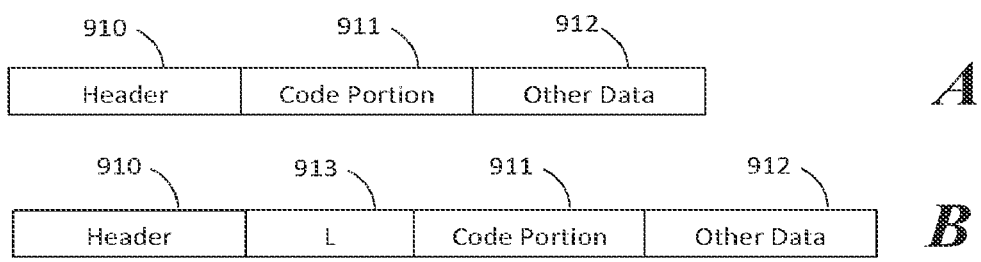
FIG. 12 shows diagrams of example message segments demonstrating positioning of codes within a message without regard to overall message length.

FIGS. 11 and 12 demonstrate specific examples of ways in which content of a message may be positionally shifted in order to increase security. For example, a default message format shown as "A" of FIG. 11 includes a header 901, a code portion 902 (a sequence of bits or bytes that includes a fixed code and/or a changing code), a random sequence forming a trailing sequence 903 and other data 904 such as a payload or additional fixed and/or changing codes. The default message may also include a leading sequence 905 before the code portion 902. When a device alters the position of code portion 903 within the message as shown in "B" of FIG. 11, the code portion 903 is shifted away from the header 901 so that the code portion 902 begins at a position P within the message, resulting in a longer leading sequence 905 preceding the code portion 902 (or the introduction of leading sequence 905 if it had not existed in the default message) and separating the header portion 901 or preamble of the message and the code portion 902. The code portion 902 may be moved to position P to provide an offset code sequence based on shifting a specific number of bits or bytes relative the beginning of the message, the end of the header 901, or some other marker within the message, or alternatively may be positioned within a window or slot of a defined length. If a device that receives a message is configured to expect the code portion 902 to begin at offset position P, as shown in "B" of FIG. 11, but the device sending the message is not properly instructed to shift the position of code portion 902 and sends a message in a default format as shown by "A" of FIG. 11, then the receiving device will attempt to read the code portion starting at position P, which is toward the end of the code portion 902 of the message format "A" of FIG. 11. As a result, the receiving device will incorrectly parse the message and extract or transcribe the code portion 902 thereby failing to properly authenticate the message or subsequent messages in a message chain or communications session. Alternatively, a device may alter the position of code portion 903 within the message as shown in "C" of FIG. 11 so that the code portion 903 is shifted toward the header 901 so that the code portion 902 begins at a position P' within the message, reducing (and in some cases eliminating) the leading sequence 905 preceding the code portion 902. If a device that receives a message is configured to expect the code portion 902 to begin at offset position P', as shown in "C" of FIG. 11, but the device sending the message does not properly shift the position of code portion 902 and sends a message in a default format as shown by "A" of FIG. 11, then the receiving device will attempt to read the code portion starting at position P', which is within the leading sequence of the message format "A" of FIG. 11. In FIG. 11, the overall message is of a fixed length so that when the code sequence in portion 902 is preceded by a leading sequence 905, the trailing sequence 903 is adjusted in length so that the starting position of the other data 904 is unaffected. The leading sequence 905 inserted between the header 901 and the code portion 902 may comprise either random bits or a predetermined sequence (for instance, the leading sequence may be a specific arrangement of bits based on a fixed code or changing code from another message). The leading sequence 905 may have a length determined based on one or more portions of a previous message. In some forms, the leading sequence 905 may be present in a default message configuration but adjusted in length based on one or more portions of a previous message. A device reading the message may be configured to locate the code portion 902 by ignoring the leading sequence 905 due to its format or configuration, by ignoring a specific number of bits following the beginning of the message or the end of the header 901, or by another method.

In FIG. 12, another method of positionally shifting a code portion of a message is shown. In FIG. 12, a default message is shown by view "A" in which a header 910 is contiguous with a code portion 911 including a fixed or changing code sequence. Other data 912 such as a payload or other codes may also be present. In view "B" of FIG. 12, the code portion 911 has been shifted a distance or amount L so that a leading sequence 913 is interposed between the header 910 and the code portion 911. A receiving device that expects to receive an offset code sequence as shown by view "B" in FIG. 12 will not be able to correctly read a message as in view "A" of FIG. 12 wherein the code portion 911 is not offset. However, if such a receiving device receives a message formatted as in view "B" of FIG. 12, it will be configured to ignore a message segment having length L and properly read code portion 911. If the device is also configured to read the other data segment 912 at a position in the message relative to code portion 911, the device's ability to accurately read the other data segment 912 will be unaffected by the addition of leading sequence 913.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A method of secure communication between a first device having a first memory and a second device having a second memory to effect an action by the second device, the method comprising:
   transmitting, from the first device to the second device, a first message, the first message including at least a first fixed code and a first changing code;
   receiving the first message by the second device;
   validating, by the second device, the first message by comparing the first fixed code and the first changing code to first stored code values stored in the second memory;
   determining, by the second device based on the first message, an offset position at which to include an offset code sequence within a response message;
   after validating the first message, transmitting the response message from the second device, the response message comprising a second fixed code and a second changing code, at least one of the second fixed code and the second changing code positioned within the offset code sequence located at the offset position;
   receiving, by the first device, the response message from the second device;
   locating, by the first device, the offset code sequence and determining at least one of the second fixed code or the second changing code from the offset code sequence;
   validating, by the first device, the response message by comparing the second fixed code and the second changing code to second stored code values stored in the first memory;
   after validating the response message, transmitting, by the first device, a third message comprising the first fixed code and a changed version of the second changing code;
   receiving, by the second device, the third message;
   validating, by the second device, the third message by comparing the first fixed code and the changed version of the second changing code to stored code values; and
   performing the action, by the second device, in response to validating the third message.

2. The method of claim 1, wherein the offset position of the offset code sequence is based on at least one of the first changing code or the first fixed code.

3. The method of claim 1, wherein the offset code sequence comprises the second fixed code and the second changing code.

4. The method of claim 1, wherein the offset position of the offset code sequence is based on a portion of the first changing code.

5. The method of claim 1, wherein the first device ignores a leading sequence in order to read the offset code sequence and determine at least one of the second fixed code or second changing code.

6. The method of claim 5, wherein the response message further comprises a trailing sequence following the offset code sequence, the trailing sequence based on a length of the leading sequence so that a total length of the leading sequence, offset code sequence, and trailing sequence together is a fixed number of bits.

7. The method of claim 1, wherein the offset position defines a starting place for the offset code sequence.

8. The method of claim 1, wherein the offset position is a message segment consisting of a predefined number of bits.

9. The method of claim 1, further comprising:
   determining, by the second device, a second offset position in which the first device is to include a second offset code sequence in the third message, the second offset position based on the response message;
   determining, by the first device based on the response message, the second offset position; and
   including the second offset code sequence in the third message at the second offset position.

10. The method of claim 9, wherein the step of determining, by the second device, the second offset position in which the first device is to include the second offset code sequence in the third message takes place before the step of transmitting the response from the second device.

11. The method of claim 9, wherein the second offset code sequence comprises the first fixed code and the changed version of the second changing code.

12. An apparatus configured to communicate with a second device to effect an action by the second device, the apparatus comprising:
   a controller circuit;
   a transmitter in operative communication with the controller circuit;
   a receiver in operative communication with the controller circuit; and
   a user input device in operative communication with the controller circuit;
   wherein the controller circuit is configured to:
      in response to detecting an input at the user input device, control the transmitter to transmit a first message that includes at least a first fixed code and a first changing code, at least one of the first changing code or first fixed code being useable to determine an offset position at which to include an offset code sequence in a second message;
      receive the second message including the offset code sequence from the second device;
      locate the offset position within the second message and read the offset code sequence;
      validate the second message by comparing a second fixed code and a second changing code from the second message to stored code values; and
      in response to validating the second message, transmit a third message including at least the first fixed code and a changed version of the second changing code, wherein the third message is configured to effect performance of an action by the second device.

13. The apparatus of claim 12, wherein the offset code sequence within the second message is preceded by a leading sequence, the leading sequence comprising random bits and having a length determined based on the first message, and wherein the controller circuit is configured to locate the offset code sequence by ignoring the leading sequence.

14. The apparatus of claim 12, wherein the controller circuit is further configured to determine a second offset position within the third message at which to include a second offset code sequence, the second offset position based on the second message.

15. The apparatus of claim 14, wherein the controller circuit is further configured to include the first fixed code and the changed version of the second changing code within the second offset code sequence.

16. A non-transitory computer readable medium having stored thereon instructions that when executed by a controller circuit of a first device cause performance of operations comprising:

configuring a first message that includes at least a first fixed code and a first changing code, at least one of the first changing code or first fixed code being useable to determine an offset position at which to include an offset code sequence in a second message;

receiving the second message including the offset code sequence;

locating the offset position including the offset code sequence within the second message using at least one of the first message, the first fixed code, and the first changing code; and determining a second fixed code and a second changing code based on the offset code sequence and validating the second message by comparing the second fixed code and the second changing code to stored code values.

17. The non-transitory computer readable medium of claim 16, the operations further comprising configuring a third message including at least the first fixed code and a changed version of the second changing code and determining a second offset position within the third message at which to include a second offset code sequence, the second offset position based on the second message.

18. The non-transitory computer readable medium of claim 17, the operations further comprising positioning the first fixed code and the changed version of the second changing code within the second offset code sequence.

* * * * *